United States Patent
Abinader, Jr. et al.

(10) Patent No.: US 9,989,619 B2
(45) Date of Patent: Jun. 5, 2018

(54) BULK PROPAGATION TIMING MEASUREMENT MESSAGING

(71) Applicant: Microsoft Technology Licensing, LLC, Redmond, WA (US)

(72) Inventors: Fuad Mousse Abinader, Jr., Manaus (BR); Eduardo Abinader, Manaus (BR)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 14/956,369

(22) Filed: Dec. 1, 2015

(65) Prior Publication Data

US 2017/0115372 A1 Apr. 27, 2017

Related U.S. Application Data

(63) Continuation-in-part of application No. 14/954,722, filed on Nov. 30, 2015, which is a continuation-in-part of application No. 14/949,777, filed on Nov. 23, 2015, now abandoned, which is a
(Continued)

(51) Int. Cl.
| | |
|---|---|
| *G01S 5/02* | (2010.01) |
| *H04L 12/26* | (2006.01) |
| *G01S 5/00* | (2006.01) |
| *H04W 64/00* | (2009.01) |
| *H04L 12/841* | (2013.01) |

(52) U.S. Cl.
CPC .............. *G01S 5/02* (2013.01); *G01S 5/0072* (2013.01); *G01S 5/0226* (2013.01); *G01S 5/0289* (2013.01); *H04L 43/0864* (2013.01); *H04W 64/00* (2013.01); *H04L 47/283* (2013.01)

(58) Field of Classification Search
None
See application file for complete search history.

(56) References Cited

U.S. PATENT DOCUMENTS

| | | | |
|---|---|---|---|
| 6,453,168 | B1 | 9/2002 | McCrady et al. |
| 7,277,413 | B2 | 10/2007 | Benveniste |
| 8,842,571 | B1 | 9/2014 | Yu et al. |

(Continued)

OTHER PUBLICATIONS

"International Search Report and Written Opinion Issued in PCT Application No. PCT/US2016/057570", dated Jan. 24, 2017, 12 Pages.

(Continued)

*Primary Examiner* — Vinncelas Louis

(57) ABSTRACT

A bulk propagation fine timing measurement (BFTM) allocation message is generated by a scheduling mobile computing device that identifies other mobile computing devices in the area. The BFTM allocation message generated by the scheduling mobile computing device indicates a scheduling order for the identified mobile computing devices and contention-free periods for the mobile computing devices to transmit the timing measurement messages. The responding mobile computing devices generate bulk propagation timing measurement (BPTM) messages that include propagation times between pairs of mobile computing devices—either two other devices or the responding device and another device. These BPTM messages are then transmitted during scheduled times frames indicated in the scheduling order.

20 Claims, 19 Drawing Sheets

Related U.S. Application Data continuation-in-part of application No. 14/922,854, filed on Oct. 26, 2015, now Pat. No. 9,723,631.

(56) References Cited

U.S. PATENT DOCUMENTS

| | | |
|---|---|---|
| 2009/0225669 A1 | 9/2009 | Qin et al. |
| 2010/0260155 A1 | 10/2010 | Grilli et al. |
| 2014/0187259 A1 | 7/2014 | Kakani et al. |
| 2014/0213193 A1 | 7/2014 | Zhang et al. |
| 2014/0254511 A1 | 9/2014 | Aldana et al. |
| 2014/0295877 A1 | 10/2014 | Hart |
| 2014/0335885 A1* | 11/2014 | Steiner .................. H04W 64/00 455/456.1 |
| 2014/0355462 A1 | 12/2014 | Aldana et al. |
| 2015/0049716 A1 | 2/2015 | Gutierrez et al. |
| 2015/0063138 A1 | 3/2015 | Aldana |
| 2015/0094103 A1 | 4/2015 | Wang et al. |
| 2015/0139212 A1 | 5/2015 | Wang et al. |
| 2015/0271776 A1 | 9/2015 | Michaelovich et al. |
| 2016/0119805 A1* | 4/2016 | Aldana ................. H04L 43/106 370/252 |

OTHER PUBLICATIONS

Ji, Lin., "Increasing Accuracy of Location Determination: Exploiting Phase Change Reconstruction and Timing measurements", In Master Thesis, Retrieved on: Jun. 29, 2015, 58 pages.

Yang, et al., "WiFi-based Indoor Positioning", In Journal of IEEE Communications Magazine, vol. 53, Issue 3, Mar. 2015, pp. 150-157.

Pritt, Noah, "Indoor Location with Wi-Fi Fingerprinting", In Proceedings of IEEE Applied Imagery Pattern Recognition Workshop: Sensing for Control and Augmentation, Oct. 23, 2013, 8 pages.

Zhou, et al., "Enhanced Wi-Fi Fingerprinting with Building Structure and User Orientation", In Proceedings of IEEE 8th International Conference on Mobile Ad-hoc and Sensor Networks, Dec. 14, 2012, pp. 219-225.

"Second Written Opinion Issued in PCT Application No. PCT/US2016/057570", dated Sep. 7, 2017, 5 Pages.

"Second Written Opinion Issued in PCT Application No. PCT/US2016/057569", dated Sep. 7, 2017, 6 Pages.

"International Preliminary Report on Patentability Issued in PCT Application No. PCT/US2016/057570", dated Jan. 26, 2018, 8 Pages.

* cited by examiner

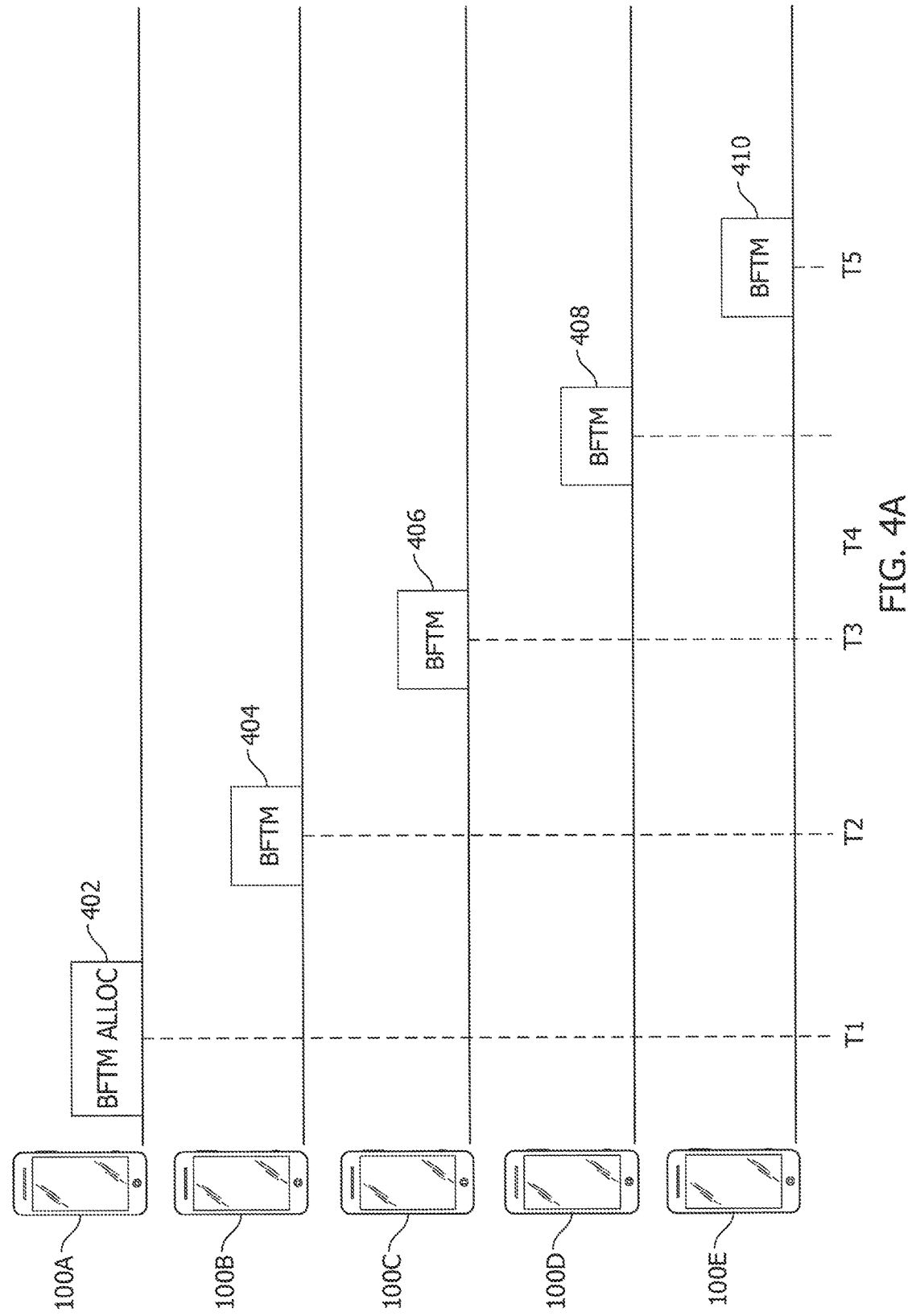

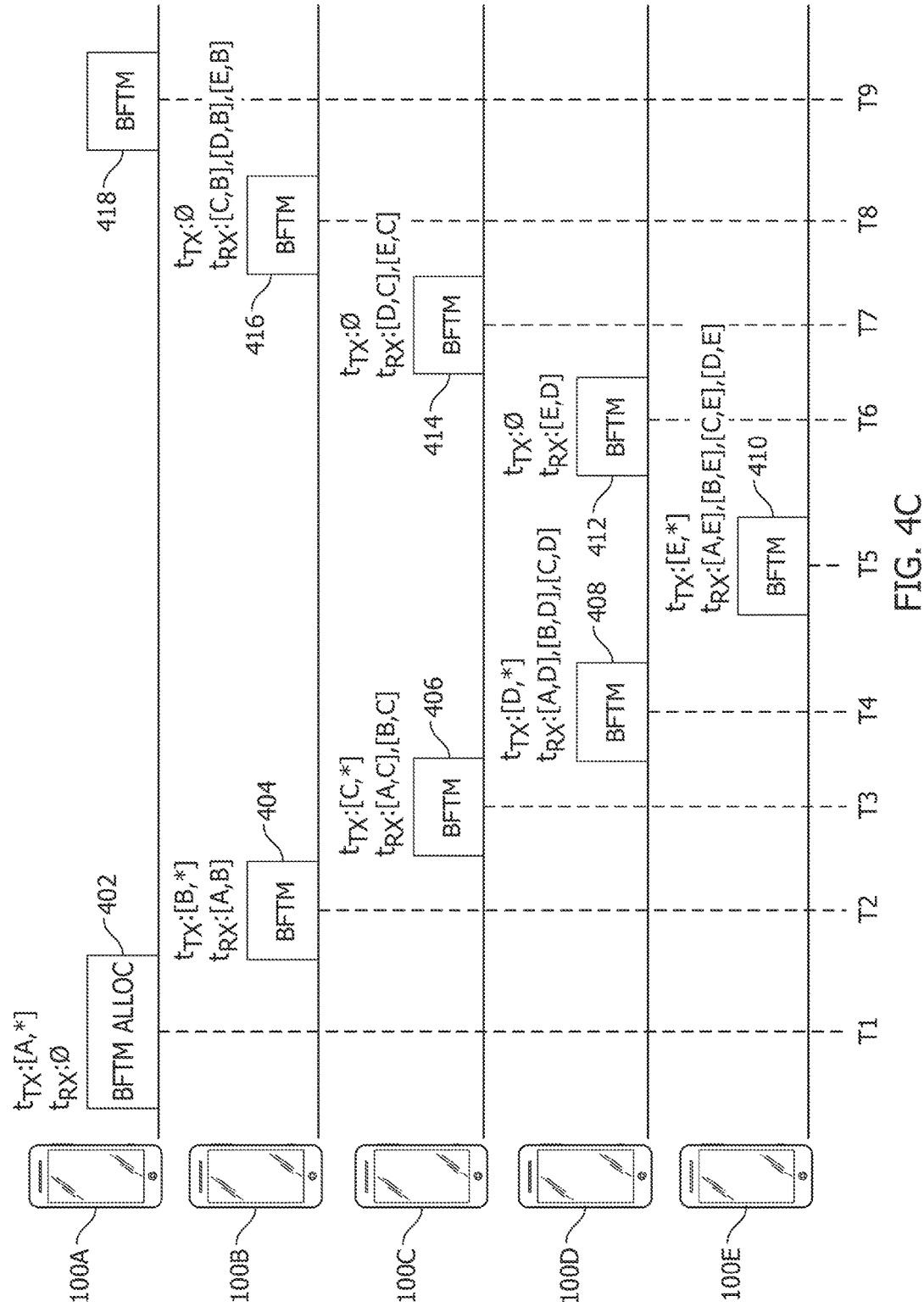

BULK PROPAGATION TIMING MEASUREMENT MESSAGING

CROSS REFERENCE TO RELATED APPLICATIONS

This application is a continuation-in-part of and claims priority to U.S. application Ser. No. 14/954,722, entitled "Bulk Fine Timing Measurement Message Scheduling" and filed on Nov. 30, 2015, which is a continuation-in-part of U.S. application Ser. No. 14/949,777, entitled "Location Detection Using Bulk Fine Timing" and filed on Nov. 23, 2015, which is a continuation-in-part of U.S. application Ser. No. 14/922,854, entitled "Bulk Fine Timing Measurement Allocation Message" and filed on Oct. 26, 2015. All of these applications are incorporated herein by reference in their entirety.

BACKGROUND

The role of today's mobile devices—e.g., smart phones, mobile tablets, and wearable computing devices—has expanded dramatically as these devices have proliferated. People do far more on their mobile devices than just make phone calls or access the Internet. New and useful applications for mobile devices are being developed at rapid pace, and many of these applications use location-detection services to perform tasks. These devices communicate through radio waves over dedicated and varying frequencies or dedicated segments of the electromagnetic spectrum. The ability to estimate the relative distance between mobile devices is important for a number of wireless device applications that require location awareness.

Global Positioning System (GPS) solutions do not perform well indoors and provide somewhat weak location-detection precision. Another location-detection service being deployed is Wi-Fi fingerprint, but this technique uses a Received Signal Strength Indication (RSSI) that provides low spatial resolution. An additional inconvenience for Wi-Fi fingerprint technology is the need for a previous calibration phase, which must be performed whenever the physical topology changes significantly. Moreover, hardware-implemented solutions, such as the manipulation of physical layer (PHY) signal properties—e.g., through signal phases of antennas and round-trip time ends—require all new hardware to be developed or managed. Location-detection services should focus on procedures that enhance accuracy beyond the RSSI barrier and then can operate effectively indoors without having to reconfigure complex PHY layers.

If location-detection services use contention-based wireless technologies (e.g., Wi-Fi), performance degradation occurs in dense deployment scenarios due to the many nodes vying for transmitting for limited frequency bandwidth. For example, a large number of mobile devices in the same geographical area may have to compete to gain access to one or more radio frequency (RF) channels.

SUMMARY

The disclosed examples are described in detail below with reference to the accompanying drawing figures listed below. The below Summary is provided to illustrate some examples disclosed herein, and is not meant to necessarily limit all examples to any particular configuration or sequence of operations.

Some examples disclosed herein are directed to generating bulk propagation timing measurement (BFTM) messages that convey propagation times between mobile computing devices. Mobile computing devices capture propagation times when communicating various timing messages between each other, and convey those propagation times to responding mobile computing devices. Responding mobile computing device generates BFTM messages that identify pairs of mobile computing devices and corresponding propagation times for prior timing message communications between the pairs of devices. A scheduling order communicated to the responding mobile computing devices dictates when the BFTM messages are to be transmitted. During designated time frames in the scheduling order, the responding mobile computing devices may transmit the BFTM messages to other mobile computing devices that use the propagation times to generate partial or absolute location mappings of the mobile computing devices in the area.

The BFTM messages disclosed herein include various data fields to convey information that can be used to determine device locations. In some examples, the BFTM messages include a maximum tolerable error value, a quantity of propagation time reports in the BFTM message, device identifiers of pairs of mobile computing devices, and propagation times for messages communicated between the pairs of devices.

In some examples, the BFTM message are transmitted along with bulk fine timing measurement (BFTM) timing messages during the designated time frames. The BFTM timing messages may include frames that indicate the times of arrival (TOAs), times of departure (TODs), or propagation timing estimates (PTEs) of BFTM timing messages from other responding computing devices. Transmitting both the BFTM timing and BFTM messages during the scheduled time frame drastically reduces the conventional number of messages communicated in an area for location-service detection.

BRIEF DESCRIPTION OF THE DRAWINGS

The disclosed examples are described in detail below with reference to the accompanying drawing figures listed below:

FIG. 4A is a timing diagram showing various mobile computing devices communicating different timing measurement messages at given times.

FIG. 4C is a timing diagram showing various mobile computing devices communicating different timing measurement messages according to a scheduled order indicated in a BFTM allocation message

Corresponding reference characters indicate corresponding parts throughout the drawings.

DETAILED DESCRIPTION

Figure 1:
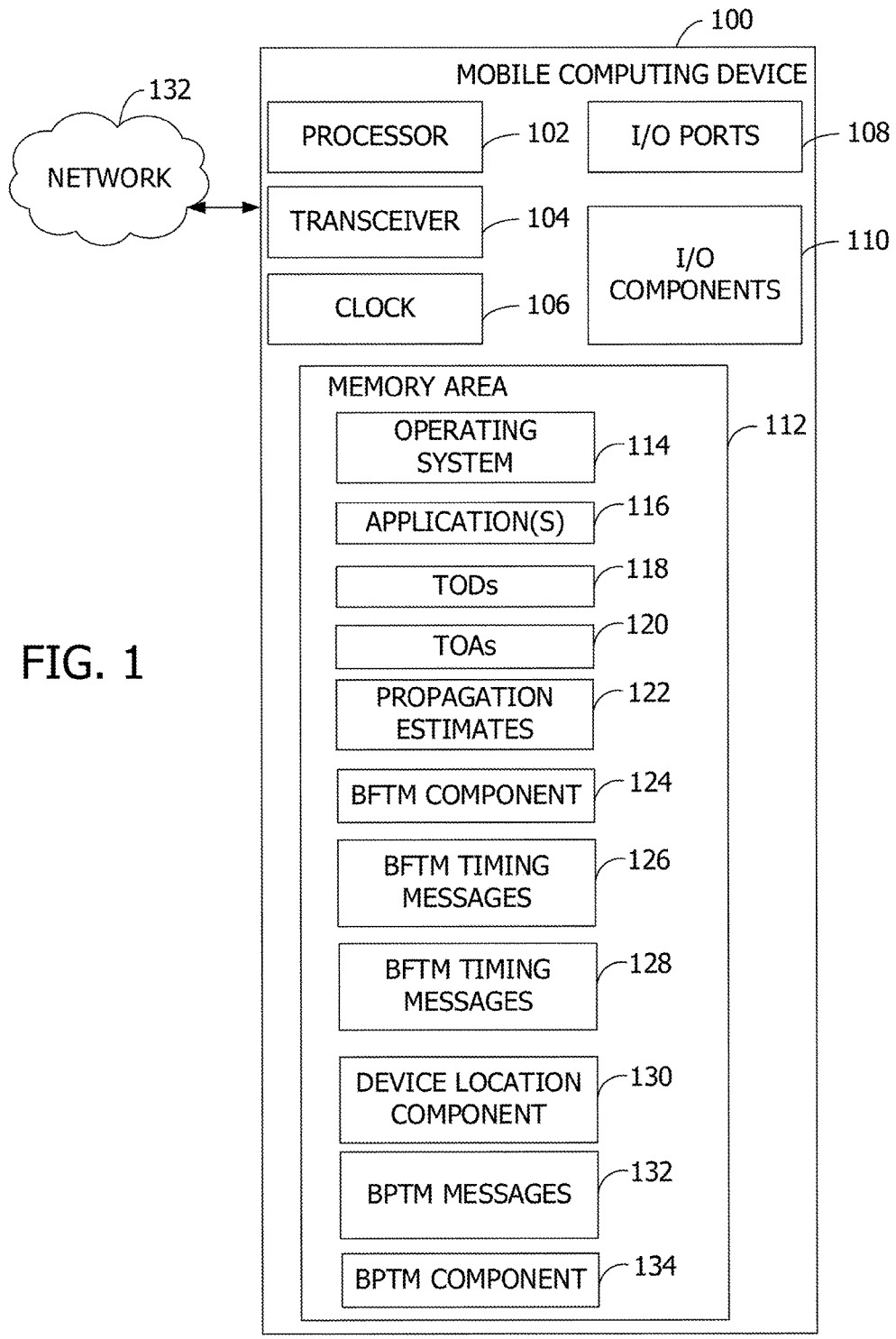
FIG. 1 is a block diagram illustrating an example of a computing device configured to perform location-detections services.

The IEEE 802.11 standard (otherwise known as Wi-Fi) provides some mechanisms to determine the locations of mobile devices using a "fine timing measurement" (FTM) procedure. But the Wi-Fi FTM procedures are very signal-intensive, demanding numerous transmissions to be carried out across somewhat limited wireless frequencies. Consequently, conventional Wi-Fi FTM is not scalable to accommodate location services indoors for large number of mobile computing devices. More specifically, the Wi-Fi fine timing measure requires a sending station to transmit a sender "time of delivery" ($TOD_{snd}$) to a receiving station at time T1. The receiving station must then determine a "time of arrival" ($TOA_{rcv}$) at time T2 and transmit the TOA and a time of acknowledgment ($T\text{-}ACK_{rcv}$) back to the sending station at time T3. The sending station assigns its own TOA (i.e., $TOA_{snd}$) at time T4 when the sending station receives $TOA_{rcv}$ and $T\text{-}ACK_{rcv}$ from the receiving station. The sending station can then compute the propagation delay between the two station—and consequently locate the receiving station relative to the sending station—based on the four different times: T1, T2, T3, and T4.

This technique requires several messages and timing parameters to be passed back and forth, cluttering up radio frequencies in large areas with many different mobile devices. The current Wi-Fi fine timing measurement technique cannot facilitate location services for large numbers of mobile devices. The number of message exchanges (M) for performing a complete graph of timing measurements among any given number of stations (n) in geographical proximity can be shown by the following Equation 1:

$$M = 2 * \frac{n!}{(n-2)!} = 2 * n * (n-1) \quad (1)$$

As shown in Equation 1, the number of messages quadratically varies based on the number of stations sending FTM messages. With only a finite bandwidth of RF frequencies to transmit messages across in a given area, either the number of stations must be reduced or the number of messages. Examples disclosed herein help reduce the latter by batching TOAs and TODs that would normally be included in multiple FTM messages into a single BFTM message.

Examples disclosed herein are directed to systems, devices, methods, and computer-storage memory for determining mobile computing device locations through transmission of BFTM messages that identify other mobile computing devices in an area. In some examples, the BFTM messages include propagation times of previous communications between pairs of devices. The propagation times for each pair may be used to generate partial or complete mappings of the mobile computing devices in a given area from the BFTM messages communicated by another device. For example, in a collection of stations A, B, C, D, and E, station C may generate and transmit a BFTM message to station A that includes the propagation times for messages between stations B and E. Station A may then calculate the distance between stations B and E without having to directly receive messages from stations B an E.

In some examples, a scheduling mobile computing device assembles and transmits a BFTM allocation message that dictates when a group of mobile computing devices in the area are to transmit BFTM messages. The responding mobile computing devices then generate the BFTM messages and transmit the generated BFTM messages at the scheduled times. The BFTM messages may include frames that indicate propagation times of messages between other mobile computing devices. Communicating these propagation times of other mobile computing devices in the BFTM message greatly reduces the number of messages needed to be transmitted between the devices in order to determine their locations.

In some of the disclosed examples, mobile computing devices generate, transmit, and use a "BFTM allocation message," which includes various message frames, to multiple other mobile computing devices within a particular area. In some examples, the message frames of the BFTM allocation message include a TOD indicative of the time the BFTM allocation message is transmitted; a designation of a number of other mobile computing devices (e.g., station B, station C, and so on); an allocation of a contention-free time period where at least a subset of the other of the mobile computing devices will transmit BFTM or FTM timing messages; a scheduling order for a subset of the mobile computing devices to transmit in a particular order (e.g., station B transmits at time T2, station C transmits at time T3, station D transmits at time T4, and so forth). Additional or alternative information may be included in the BFTM allocation message, including the frame elements disclosed herein and depicted in the accompanying drawings.

In some of the disclosed examples, mobile computing devices generate, transmit, and use a "BFTM timing message," which includes message frames, during the allocated time in a contention-free period and according to the scheduling order indicated by the BFTM allocation message. In some examples, the message frames of the BFTM timing message include a TOD indicative of the time the BFTM timing message is transmitted; multiple TOAs, including the TOA of the BFTM allocation message and TOAs of previously received FTM or BFTM timing or allocation messages from other mobile computing devices; and one or more propagation timing estimates corresponding to the propagation time of messages from the other mobile computing devices (e.g., messages station B received from C, D, and E) or from the mobile computing device sending the BFTM allocation message (e.g., BFTM allocation message received by station B from station A).

In some of the disclosed examples, mobile computing devices generate, transmit, and use a "BFTM message" that lists mobile computing devices and corresponding propagation times or propagation timing estimates associated with BFTM, FTM, or BFTM messages communicated between the various pairs of mobile computing devices. For example, a BFTM message from station C may identify stations B and D and indicate propagation times for prior BFTM messages between stations B and D. In some examples, the BFTM messages are scheduled and transmitted at particular timeframes in which other BFTM timing messages are scheduled and transmitted. These timeframes may be designated in a BFTM allocation message. Thus, the BFTM allocation message not only schedules the BFTM timing message transmissions disclosed herein, but also, in some examples, schedules transmission of BFTM messages for a group of mobile computing devices in a given area.

The propagation information in the BFTM messages may be used by the scheduling mobile computing device or mobile computing devices to construct a partial or complete mapping of the locations of mobile computing devices in a given (e.g., indoor) area. Mapping the various devices based on respective propagation distances to other devices may be accomplished in a number of ways. In some examples, the propagation times are translated into relative distances using a transmission constant (e.g., speed of light), and the relative distances for multiple devices are assembled into partial graphs until all relative distances between the mobile computing devices are known and can be assembled into a complete graph. For purposes of this disclosure, a "partial mapping" indicates a mapping of only some of the distances between the mobile computing devices scheduled to exchange BFTM or FTM messages. A "complete mapping" indicates a mapping of all the distances between the mobile computing devices scheduled to exchange BFTM, BFTM, or FTM messages. Examples of partial mappings are illustrated in accompanying FIGS. 16A-B, and an example of a complete mapping is illustrated in accompanying FIG. 16C.

The BTPM messages disclosed herein enable location services in a given area to be conducted more efficiently. In conventional systems using various techniques in today's IEEE 802.11 standard, there are no ways to share the propagation times of other devices effectively. The disclosed BFTM messages provide the ability to transmit such information, making every mobile computing device a conduit for communicating the whereabouts of other devices in an area.

This disclosure references the scheduling of different times for mobile computing devices in an area to transmit BFTM timing messages. These same scheduled times of transmission may be used, in some examples, to schedule and transmit BFTM messages, either alone or in addition to the BFTM timing messages. For example, if station A schedules stations B-E to transmit BFTM timing messages, stations B-E may also transmit BFTM messages during those scheduled times. Some of the examples disclosed herein schedule transmission of the BFTM timing messages over transmission channels during congestion-free periods. Transmitting BFTM messages during such times ensures that the BFTM messages are effectively communicated during non-congested periods, and consequently received by the other mobile computing devices on a single transmission (i.e., without having to retransmit due to network traffic congestion). Reducing the need to have to retransmit messages greatly reduces the number of messages needing to be exchanged in an area, which leads to more accessibility over a network.

In some examples, the scheduling order indicated in the BFTM allocation message specifies a particular order for the mobile computing devices to transmit their respective BFTM timing messages. Some examples involve a scheduling order that schedules a given number (N) of identified mobile computing devices to transmit BFTM timing messages twice in a sequential order. The sequential order, in some examples, specifies that N number of mobile computing devices (D) shall transmit in the following sequence: $D_1$, $D_2 \ldots D_{N-2}, D_{N-1}, D_N, D_{N-1}, D_{N-2} \ldots D_2, D_1, D_{SCHD}$—where $D_{SCHD}$ represents the scheduling mobile computing device transmitting the BFTM allocation message. In such examples, every mobile computing device transmits BFTM timing messages twice, except for the last scheduled one ($D_N$).

For the sake of clarity, this disclosure refers to the aforesaid scheduled sequence of transmissions as an "echoing" schedule of transmissions, meaning that the devices are scheduled to transmit in a forward sequence and then transmit again in reverse order. As used herein, "echoing" describes the transmission order of the scheduled mobile computing devices, and has nothing to do with sound or the actual messages being transmitted—just the sequential order of such transmissions. Using an echoing scheduling order to communicate BFTM timing messages between mobile computing devices allows the devices to convey a complete set of the timing and propagation estimates between each of the devices in a scheduled, uncontested manner with a minimal number of transmissions. As a result, the number of messages needed to determine the locations of devices in a given area are drastically reduced, which saves vital power, memory, resources while keeping available network bandwidth largely uncongested.

Alternative examples may use scheduling orders that specify the mobile computing devices are to sequentially transmit BFTM timing messages only a single time, e.g., in the sequence of $D_1, D_2 \ldots D_{N-2}, D_{N-1}, D_N, D_{SCHD}$. Other examples may use echoing scheduling orders that specify the mobile computing devices are to sequentially transmit BFTM timing messages more than twice, e.g., four times in the order of $D_1, D_2 \ldots D_{N-2}, D_{N-1}, D_N, D_{N-1}, D_{N-2} \ldots D_2$, $D_1, D_{SCHD}, D_1, D_2 \ldots D_{N-2}, D_{N-1}, D_N, D_{N-1}, D_{N-2} \ldots D_2$, $D_1, D_{SCHD}$.

Other examples use a scheduling order that dynamically sets the order of transmission to occur based on historical propagation timing estimates captured from previously received BFTM or FTM messages. Such examples may mine such messages for timing, propagation, or location information that indicates the probable locations or distances of detected mobile computing devices relative to each other. The BFTM allocation message may then include a scheduling order for the mobile computing devices to transmit BFTM timing or FTM messages in a sequence—either once or in echoing fashion—starting with the mobile computing devices likely (based on the previous timing, propagation, or location parameters) closest to other mobile computing devices to transmit first, the devices likely farthest away to transmit last, and the rest of the devices to progressively transmit based on their probable proximity to the other devices. For example, if five stations are being scheduled, the station closest to the other four may be scheduled to transmit first, the next closest station may be configured to transmit second, and so forth. Closeness to other stations may be determined based on an average of distances between the devices. In other words, one station that, on average, is 3 m away from four other devices may be scheduled to transmit before the another station that is, on average, 4 m away from the four other devices. Other techniques may alternatively be used to select the order of transmission between the various mobile computing devices.

The BFTM timing messages may include multiple TOAs related to messages received from other mobile computing devices. For example, mobile device A may generate a BFTM allocation message with an assigned TOD to mobile device B, and mobile device B may respond back with a BFTM timing message that includes its own TOD, the TOA of the message from mobile device A, and TOAs of previously received messages from other computing devices (e.g., devices C, D, E, and beyond).

Batching these additional TOAs of the messages received by mobile device B from the other mobile devices into the BFTM timing message back to mobile device A reduces the need for mobile device A to separately communicate with the other mobile devices, which, when compounded across multiple devices dramatically reduces the above quadric relationship of messages (M) to devices (n) experienced in the aforesaid FTM procedure to the following relation shown in Equation 2:

$$M=(2*n)-1 \qquad (2)$$

As shown in Equation 2, the number of messages varies linearly—instead of quadratically—with the number of devices, providing a scalable model for rendering indoor location services to accommodate far more mobile devices than conventional FTM location procedures.

Reducing the number of messages being exchanged reduces processor, memory, and transmission loads of today's mobile computing devices during location detection. It also moves devices away from having to GPS, line-of-sight, or Wi-Fi fingerprint and more complicated hardware-specific (e.g., PHY) configurations. Additionally, the BFTM messages and procedures disclosed herein provide increased reliability for location services, and enhance the user experience; whereas, older technologies typically can only locate devices within a range of 3 m. Moreover, the exchange of BFTM messages may be conducted indoors and do not require unobstructed lines of sight from satellites, as required by GPS.

Throughout this disclosure, the terms "mobile computing device" and "station" are used interchangeably. One skilled in the art will understand and appreciate that a "station," mobile computing device (e.g., a smart phone, a mobile tablet, a wearable device, Wi-Fi terminal, etc.) may be referred to simply as a station. Additionally, this disclosure generally references "timing measurement messages," which may include BFTM timing messages or standard FTM messages. The former refers to the specific BFTM timing messages disclosed herein that include batched TOAs from multiple mobile computing devices, TODs, propagation time estimates, or a combination thereof. And the latter includes standard FTM messages, such as the messages and procedures described in the forthcoming 802.1REV-mc standard (to be called 802.11-2016[2]).

Having generally provided an overview of some of the disclosed examples, attention is drawn to the accompanying drawings to further illustrate some additional details. The illustrated configurations and operational sequences are provided for to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

FIG. 1 is a block diagram illustrating an example of a mobile computing device 100 configured to perform location-detection services in accordance with some examples disclosed herein. The mobile computing device 100 includes a processor 102, a transceiver 104, a clock 106, input/output (I/O) ports 108, I/O components 110, and a memory area 112. The memory area 112 stores machine-executable instructions and data that include an operating system 114, various applications 116, times of delivery (TODs) 118 and times of arrival (TOAs) 120 for BFTM and FTM messages (both BFTM allocation and/or BFTM timing), propagation estimates 122, a BFTM component 124, BFTM allocation messages 126, BFTM timing messages 128, a device location component 130, BFTM messages 132, and a BFTM component 134. The mobile computing device 100 may communicate across a public, private, or hybrid network 130. The depicted mobile computing device 100 is but one example of a suitable computing environment and is not intended to suggest any limitation as to the scope of use or functionality of the disclosed examples. Alternative or additional components may be used in other examples.

The mobile computing device 100 may take the form of a mobile computing device or any other portable device. In some examples, the mobile computing device 100 may be a mobile phone, laptop, tablet, computing pad, netbook, gaming device, electronic kiosk, wearable device (which may include a natural user interface), portable media player, or other type of computing device that uses touchpads or touch screens. The mobile computing device 100 may also include less portable devices such as desktop personal computers, kiosks, tabletop devices, industrial control devices, wireless charging stations, gaming consoles, servers, electric automobile charging stations, control systems, and the like. Additionally, the mobile computing device 100 may represent a group of processors or other mobile computing devices 100.

The processor 102 may include one or more processing units that are programmed to execute computer-executable instructions for implementing aspects of the disclosure. The instructions may be performed by the processor 102 or by multiple processors within the mobile computing device 100, or performed by a processor 102 external to the mobile computing device 100. In some examples, the operations illustrated in the accompanying FIGS. 5 and 6 may be implemented as software instructions encoded on a computer-readable medium, in hardware programmed or designed to perform the operations, or both. Moreover, in some examples, the processor 102 represents an implementation of analog techniques to perform the operations described herein. For example, the operations may be performed by an analog computing device and/or a digital computing device, or the operations may be implemented by a system on a chip (SoC) or other circuitry (e.g., a plurality of interconnected, electrically conductive elements). Further still, the processor 102 may operate in a virtualized environment, operating across one or more other computing devices or servers.

The transceiver 104 is an antenna capable of transmitting and receiving RF signals. The clock 106 provides a clock signal. I/O ports 108 allow mobile computing device 100 to be logically coupled to other devices including I/O components 110—some of which may be built into the mobile computing device 100—that present, record, receive, or otherwise capture data from a user of the mobile computing device 100 or the surrounding environment. Example I/O components 110 include, without limitation, a speaker, a sound card, a camera, a microphone, a vibration motor, an accelerometer, a joystick, a scanner, a printer, a wireless communication module (e.g., BLUETOOTH®, radio frequency, etc.), global positioning system (GPS) hardware, a photoreceptive light sensor, or other chipsets and circuitry for capturing information related to the user or the user's environment.

The memory area 112 includes any quantity of computer-storage media associated with or accessible by the mobile computing device 100. The memory area 112 may be internal to the computing device 100 (as shown in FIG. 1), external to the mobile computing device 100 (not shown), or both (not shown). Examples of memory in the memory area 112 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and be accessed by the mobile computing device 100. Such memory may also take the form of volatile and/or nonvolatile memory; may be removable, non-removable, or a combination thereof; and may include various hardware devices (e.g., solid-state memory, hard drives, optical-disc drives, etc.). For the purposes of this disclosure, however, "computer storage media" does not include carrier waves or propagating signaling.

The operating system 114 is executed by the processor 106 and controls operational aspects of the mobile computing device 100. The applications 116, when executed by the processor 102, operate to perform software or hardware functions on the computing device 100, some of which may require location detection. Examples of applications 224 include, without limitation, mail application programs, web browsers, text editors, spreadsheet programs, calendar application programs, gaming programs, address book application programs, messaging programs, media applications, location-based services, search programs, mobile applications, and the like. The applications 112 may communicate with counterpart applications 112 or services on other mobile computing devices 100, such as web services accessible via a network.

The mobile computing device 100 may communicate over network 130. Examples of computer networks 132 include, without limitation, a wireless network, landline, cable line, fiber-optic line, local area network (LAN), wide area network (WAN), or the like. The network 132 may also comprise subsystems that transfer data between servers or mobile computing devices 100. For example, the network 132 may also include a point-to-point connection, the Internet, an Ethernet, a backplane bus, an electrical bus, a neural network, or other internal system.

To communicate across the network 132, the mobile computing device 100 may also include a network interface card and/or computer-executable instructions (e.g., a driver) for operating a network interface card that provides access to the network. Communication between the mobile computing device 100 and other devices over the network may occur using any protocol or mechanism over any wired or wireless connection. In some examples, the communications interface is operable with short-range communication technologies such as by using near-field communication (NFC) tags, BLUETOOTH® tags, or the like. Examples of network transfer protocols include, for example but without limitation, the hypertext transfer protocol (HTTP), file transfer protocol (FTP), simple object access protocol (SOAP), or the like. Examples are not limited to any particular communication protocol, message language, or scripting language, as one skilled in the art will appreciate that different languages and protocols may be used to interact with distributed applications.

Figure 3A:
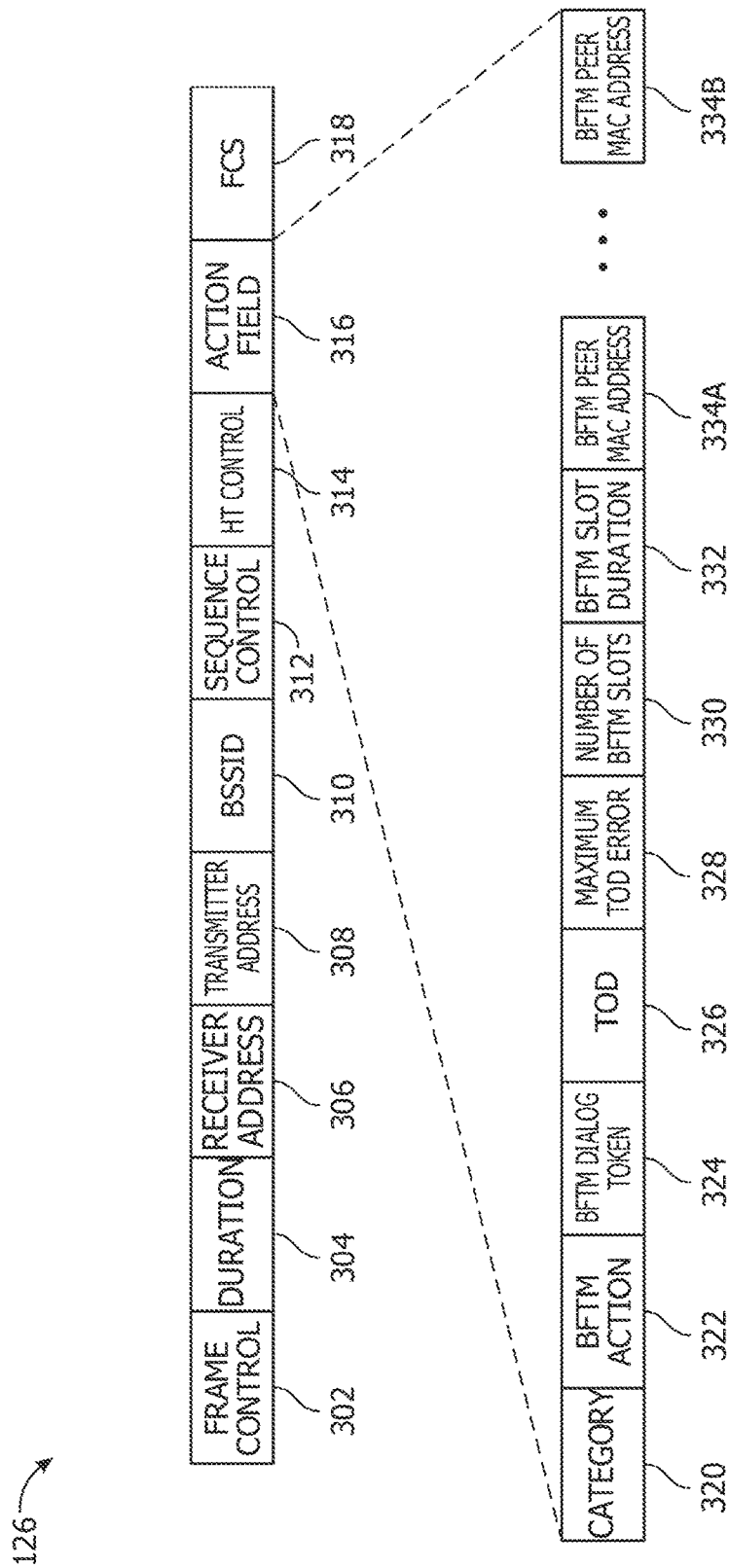
FIG. 3A illustrates an exemplary BFTM allocation message.
Figure 3B:
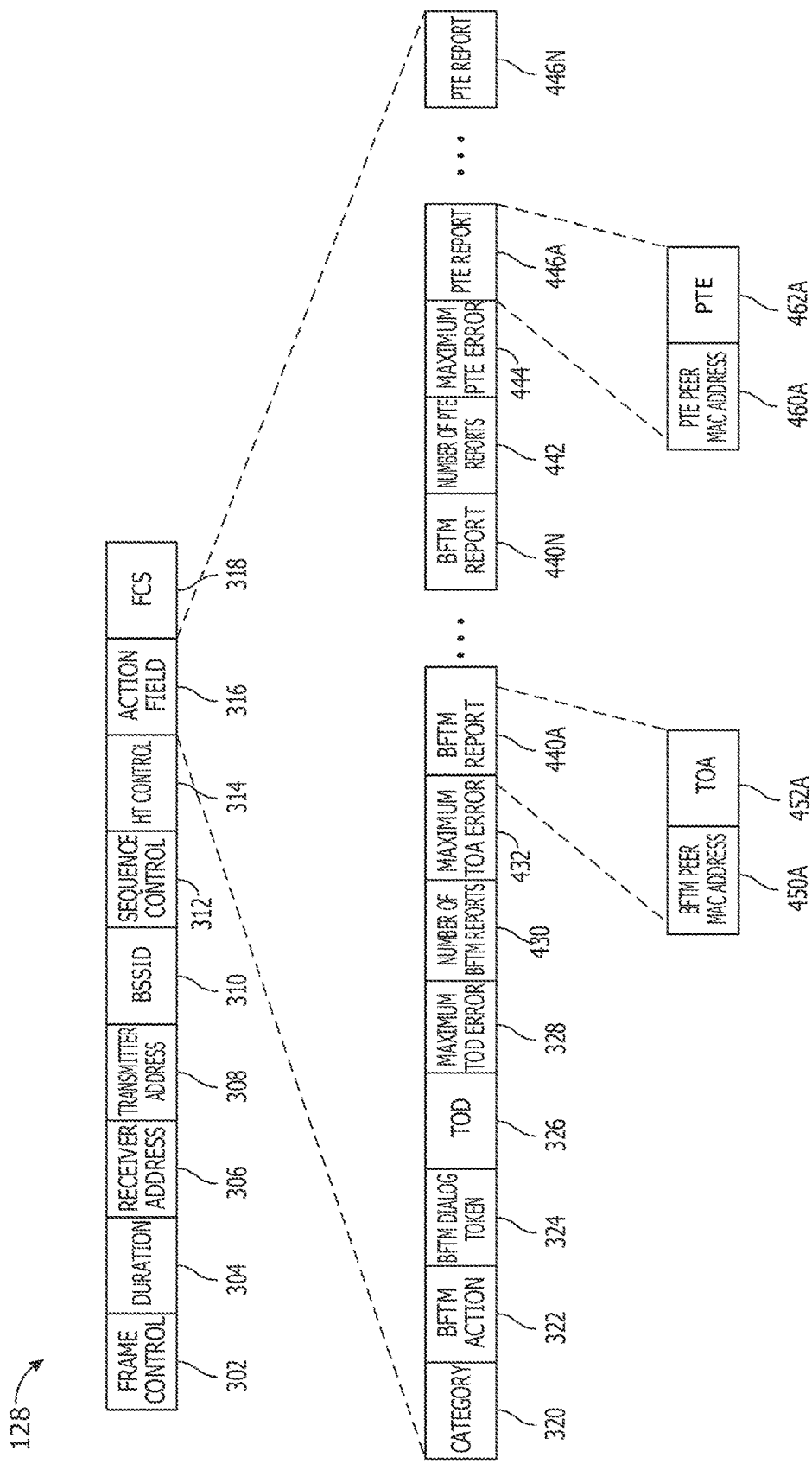
FIG. 3B illustrates an exemplary BFTM timing message.

The TODs 118 refer to the "times of delivery" that BFTM allocation messages 126 and BFTM timing messages 128 are transmitted from the mobile computing devices 100. BFTM allocation messages 126 and BFTM timing messages 128, which are described in more detail below and examples are given in FIGS. 3A-3B, represent messages that are wirelessly transmitted (e.g., via Wi-Fi™ BLUETOOTH®, ZIGBEE®, Long-Term Evolution (LTE), or some other messaging protocol) that include message frames indicating the various disclosed TOD, TOA, device address, message duration, and other information used by the techniques disclosed herein to locate the mobile computing devices 100 within a given area. As mentioned above, the BFTM allocation message 126 may include a TOD indicative of the time the BFTM allocation message 126 is transmitted; a designation of a number of other mobile computing devices 100 (e.g., station B, station C, and so on); an allocation of a contention-free time period where at least a subset of the other of the mobile computing devices 100 will transmit BFTM timing messages 126; a scheduling order for a subset of the mobile computing devices to transmit in a pre-defined order (e.g., station B transmits at time T2, station C transmits at time T3, station D transmits at time T4, and so forth).

The TOAs 120 refer to the "times of arrival" of given BFTM allocation messages 126, BFTM timing messages 128, and/or FTM messages. The TOAs 120 stored on one mobile computing device 100 may include the times associated with messages the mobile computing device 100 actually receives as well as well as times that messages were received by other mobile computing devices 100 that are transmitting BFTM timing messages 128. For example, if station D received a BFTM timing message 128 from station B at time T3, station D may transmit a corresponding TOA and TOD of this BFTM timing message 128 (referenced as $TOA_{BD}$ and $TOD_{BD}$) in subsequently transmitted BFTM timing messages 128. These subsequently transmitted BFTM timing messages 128 may then be receiver by stations A, B, C, and E, which may each include the $TOA_{BD}$ and $TOD_{BD}$ timing parameters in their own BFTM timing messages 128.

The BFTM allocation messages 126 and the BFTM timing messages 128 are timing measurement messages generated by the BFTM message component 130 for communication to other mobile computing devices 100. As mentioned above, the BFTM allocation message may include a TOD indicative of the time the BFTM allocation message is transmitted; a designation of a number of other mobile computing devices (e.g., station B, station C, and so on); an allocation of a contention-free time period where at least a subset of the other of the mobile computing devices will transmit BFTM or FTM timing messages; a scheduling order for a subset of the mobile computing devices to transmit in a pre-defined order (e.g., station B transmits at time T2, station C transmits at time T3, station D transmits at time T4, and so forth).

The BFTM timing message 128 may include a TOD indicative of the time the BFTM timing message 128 was or is transmitted; multiple TOAs, including the TOA of the BFTM allocation message 126 and TOAs of previously received FTM or BFTM timing messages 126; and one or more propagation timing estimates 122 corresponding to the propagation times of BFTM or FTM timing messages 126 from the other mobile computing devices 100 (e.g., messages station B received from C, D, and E), or from the mobile computing device 100 sending the BFTM allocation message (e.g., BFTM allocation message 126 received by station B from station A). Examples of the BFTM allocation messages 126 are illustrated in FIG. 3A and described in more detail below. Examples of the BFTM timing messages 128 are illustrated in FIG. 3B and described in more detail below.

Propagation timing estimates 122 are time estimates that are determined based on the TODs and TOAs of the BFTM allocation messages 126 or the BFTM timing messages 128. The device location component 130 may determine the location of the mobile computing device 100 or other mobile computing devices 100 by applying a particular constant (e.g., the speed of light or approximately 299,792,458 m/s) to the propagation timing estimates 122 to determine, based on the TODs 118 and TOAs 120 how far away the mobile computing devices 100 are from each other. Some examples of this disclosure batch multiple TOAs associated with other mobile computing devices 100 into a single BFTM timing message 128 for a given responding mobile computing device 100, and these TOAs may be used to determine the locations of the other mobile computing devices 100 using the responding mobile computing devices 100's single BFTM timing message 128.

Additionally, the device location component 130 may be configured to identify responding mobile computing devices 100 within a given area or proximity to the mobile computing device 100. In some examples, proximity is determined based on receipt of signaling from the other mobile computing devices 100 in the area. Alternatively or additionally, the device location component 130 may use the propagation timing estimates 122 communicated in the BFTM timing messages 128 to calculate distances between the mobile computing devices 100. Using these calculated distances, the device location component 130 may build a relative or absolute mapping of the mobile computing devices 100 that are exchanging BFTM allocation or timing messages 126, 128. For example, if station B may determine that station D is 3 m away based on the propagation timing estimate 122 calculated from the TOD of a BFTM timing message 128 from station B and the corresponding TOD that station B's BFTM timing message 128 was received at station D. This relative 3 m distance may then be compared by station D (or any other station receiving or calculating the distance) with relative distances of other stations to determine the location of station B. Using the BFTM timing messages 128 discussed herein, mobile computing devices 100 can be accurately located within a spatial resolution of about 3 cm, which is largely sufficient for most mobile-device applications.

To give a more concrete example, suppose station A transmits a BFTM allocation message 126 to stations B, C, D, and E in a given area. Station A's BFTM allocation message 126, in some examples, includes a TOD indicating the message's time of transmission from station A. Stations B, C, D, and E receive the BFTM allocation message 126, and each capture the TOA that the BFTM allocation message 126 was received. The BFTM allocation message may also include a scheduling order indicating particular timing periods the stations B, C, D, and E are to transmit BFTM timing messages 128, e.g., stations B, C, D, and E may be scheduled to transmit at times T1, T2, T3, and T4 on a particular or varying RF channel. Each station may then transmit a BFTM timing message 128 during the respectively scheduled time that includes the TOA that the station received the BFTM allocation message 126, the TOD of the station's BFTM timing message 128, and/or a propagation timing estimate 122 indicating the distance of the station from the scheduling station A. Such a propagation timing estimate 122 may be computed by the station using the TOD from the BFTM allocation message 126, the TOA that the station received the BFTM allocation message 126, and one or more constants (e.g., the speed of light).

In some examples, the BFTM timing messages 128 are received by some or all of the responding stations (e.g., stations B-E) in addition to the scheduling station (e.g., station A). For example, responding station B may transmit a BFTM timing message 128 that is received by scheduling station A and also responding stations C, D, and E. In some examples, each station identifies the TOA that the BFTM timing message 128 was received by the station (e.g., the TOA that station D received the BFTM timing message of station B), and uses the TOD in the BFTM timing message 128 along with a propagation constant (e.g., the speed of light) to determine the propagation timing estimate 122 between the two stations. Continuing along with the aforesaid example, station D may receive the BFTM timing message 128 of station B; identify the TOA that the message was received at station D, and determine a propagation timing estimate 122 between stations B and D using the TOD in the BFTM timing message 126 and the identified TOA indicating when station D received the BFTM timing message 126.

In some examples, these additional timing and propagation timing estimate parameters—again, the TOD of the BFTM timing message 128 from station B, the TOA that station D received the BFTM timing message 128 from station B, and the propagation timing estimate calculated based on such timing parameters—are included in the BFTM timing messages 128 of the mobile computing devices 100. Thus, the BFTM timing message 128 of station D may include the TOD, TOA, and propagation timing estimate corresponding to the BFTM timing message 128 received from station B in addition to the TOA, TOD, and the propagation timing estimate of station D with respect to the BFTM allocation message 126 from station A. In this manner, the BFTM timing messages 128 are scalable to include timing and propagation information from other responding mobile stations as well as the scheduling mobile station. Piggybacking the timing and propagation information from other mobile stations within a single BFTM timing message 128 drastically reduces the number of messages needing to be communicated to determine the propagation times between the various mobile stations. These propagation times may be used in determining device locations, so the various examples disclosed herein also eliminate much of the signaling traffic needed to locate devices in a given area.

The BFTM allocation message 126 may also indicate contention-free times and a sequential order for responding mobile computing devices 100 to transmit BFTM timing messages 128. In some examples, the scheduling order is provided through sequentially listing identifiers (e.g., MAC, IP, or the like) of responding mobile computing devices 100 in the order the devices 100 are to transmit. For example, the FTM allocation message 126 may identify station A, then station B, then station C, then station D, and then station E, thereby designating the stations to respectively transmit BFTM timing messages 128 in such order. Alternative examples may effectuate the scheduling order by providing the order of transmission with various indicators included in the BFTM allocation message 126 (e.g., station A(1), station B(2), station C(3), and so forth.

Moreover, as previously discussed, some examples schedule a given number (N) of identified mobile computing devices (Ds) to transmit the BFTM timing messages 128 twice in the following order: $D_1, D_2 \ldots D_{N-2}, D_{N-1}, D_N, D_{N-1}, D_{N-2} \ldots D_2, D_1, D_{SCHD}$—where $D_{SCHD}$ represents the scheduling mobile computing device transmitting the BFTM allocation message 126. As mentioned above, using this type of echoing sequence, every mobile computing device 100 is able to transmit BFTM timing messages 128 twice, except for the last scheduled device ($D_N$), which only transmits once in some examples. Alternative examples may use scheduling orders that specify the mobile computing devices 100 are to sequentially transmit BFTM timing messages 128 only a single time, e.g., in the sequence of $D_1, D_2 \ldots D_{N-2}, D_{N-1}, D_N, D_{SCHD}$. Other examples may use echoing scheduled orders that specify the mobile computing devices 100 are to sequentially transmit BFTM timing messages 128 more than twice, e.g., four times in the order of $D_1, D_2 \ldots D_{N-2}, D_{N-1}, D_N, D_{N-1}, D_{N-2} \ldots D_2, D_1, D_{SCHD}, D_1, D_2 \ldots D_{N-2}, D_{N-1}, D_N, D_{N-1}, D_{N-2} \ldots D_2, D_1, D_{SCHD}$.

Again, using an echoing scheduling order to communicate BFTM timing messages between mobile computing devices allows the devices 100 to convey a complete set of the timing and propagation estimates between each of the devices 100 in a scheduled, uncontested manner with a minimal number of transmissions. As a result, the number of messages needed to determine the locations of devices in a given area are drastically reduced, which saves vital power, memory, resources while keeping available network bandwidth largely uncongested.

Alternative examples may use scheduling orders that specify the mobile computing devices 100 are to sequentially transmit BFTM timing messages 128 and/or FTM timing messages only a single time, e.g., in the sequence of $D_1, D_2 \ldots D_{N-2}, D_{N-1}, D_N, D_{SCHD}$. Other examples may use echoing scheduling orders that specify the mobile computing devices 100 are to sequentially transmit BFTM timing messages 128 and/or FTM timing messages more than twice, e.g., four times in the order of $D_1, D_2 \ldots D_{N-2}, D_{N-1}, D_N, D_{N-1}, D_{N-2} \ldots D_2, D_1, D_{SCHD}, D_1, D_2 \ldots D_{N-2}, D_{N-1}, D_N, D_{N-1}, D_{N-2} \ldots D_2, D_1, D_{SCHD}$.

The BFTM allocation message 126 may include a scheduling order for the mobile computing devices to transmit BFTM timing or FTM messages in a sequence—either once or in echoing fashion—starting with the mobile computing devices 100 that probably (based on the previous timing, propagation, or location parameters) is closest to other mobile computing devices 100 to transmit first, the device 100 likely farthest away to transmit last, and the rest of the devices 100 to progressively transmit based on their probable proximity to the other devices 100 or the scheduling device 100. Considering again previously discussed examples, if five stations are being scheduled, the station closest to the other four may be scheduled to transmit first, the next closest station may be configured to transmit second, and so forth. Closeness to other stations may be determined based on an average of distances between the devices 100. In other words, one station that, on average, is 3 m away from four other devices 100 may be scheduled to transmit before the another station that is, on average, 4 m away from the four other devices 100. Other techniques may alternatively be used to select the order of transmission between the various mobile computing devices 100.

Other examples use a scheduling order in the BFTM allocation message 126 that dynamically sets the order of transmission to occur based on historical propagation timing estimates captured from previously received BFTM (timing or allocation) and/or FTM messages. In such examples, the BFTM component 124 mines or otherwise analyzes the timing, propagation, or location information of previous timing messages (BFTM allocation, BFTM timing, or FTM) to determine the probable locations or distances of detected mobile computing devices 100 relative to each other. Alternatively, the probable locations or distances may previously be determined by the BFTM component 124 through prior cycles of BFTM messaging, and such locations or distances may be stored in the memory area 112 or on a remote device (e.g., server, other mobile computing device 100, etc.) and accessible over the network 132. For instance, a Web service may track the locations of particular devices in a given area, on a particular cellular network, or in some other grouping. In some examples, "probable" locations may be determined as the previously determined location of a mobile computing device 100, a previous location adjusted based on detected movement of the device 100 and the time lapse since the detected movement (e.g., station A was detected to be moving at 10 mph in a given direction 5 seconds ago), or identification of the mobile computing device through other non-FTM ways (e.g., mobile payment at a particular vendor, NFC kiosk interaction, etc.).

The mobile computing device 100 includes a BFTM component 134 that generates BFTM messages 132 based on received propagation timing information from other mobile computing devices 100. The BFTM messages 132 generated by the BFTM component 134 are transmitted by the mobile computing device 100 to other mobile computing devices in an area. The mobile computing device 100 may also receive and store the BFTM messages 132 from the other mobile computing devices 100 in a given area. In some examples, BFTM messages 132 generated by the BFTM component 134 include the information illustrated in FIG. 11. In particular, the BFTM component 134 takes received propagation times of previously communicated BFTM, FTM, or BFTM messages between a pair of mobile computing devices 100, such as the mobile computing device 100 generating and transmitting the BFTM message 132, other mobile computing devices 100, or a combination thereof.

For example, a BFTM message 132 generated and transmitted by station D may include the propagation time of a previously communicated BFTM timing message 128 between station D and station C, the propagation time of a previously communicated FTM message between stations E and B, and the propagation time of a previously communicated BFTM message between stations B and C. As previously discussed, the time it takes for messages to propagate between two different mobile computing devices 100 directly correlates—by some constant factor (e.g., speed of light)—to the distance the two devices 100 are from each other.

In some examples, responding mobile computing devices 100 determine when to transmit BFTM messages 132—either generated internally or received from other mobile computing devices 100—by the scheduling order included in the BFTM allocation message 126. As discussed in more detail below, the scheduling order in the BFTM allocation message 126 may indicate when each responding mobile computing device 100 is to transmit BFTM timing messages 128. These windows of transmission may also be used for scheduling when the mobile computing devices 100 are to transmit the BFTM messages 132 as well. For example, if scheduling station A issues a BFTM allocation message 126 at time T1 that schedules responding stations B-E to transmit BFTM timing messages 128 at times T2-T5, the responding stations B-E may also transmit BFTM messages 132 during those allotted times in addition or in combination with the BFTM timing messages 128. The scheduling station A may also operate as a responding station at a particularly scheduled time, during which station A may also transmit a BFTM message 132. Thus, all the mobile stations A-E, having the BFTM component 134, are equipped to generate and transmit BFTM messages 132 that include the propagation timing information related to the time it takes BFTM, BFTM, or FTM messages to be communicated between from itself to other devices, between the other devices themselves, or a combination thereof.

Figure 2:
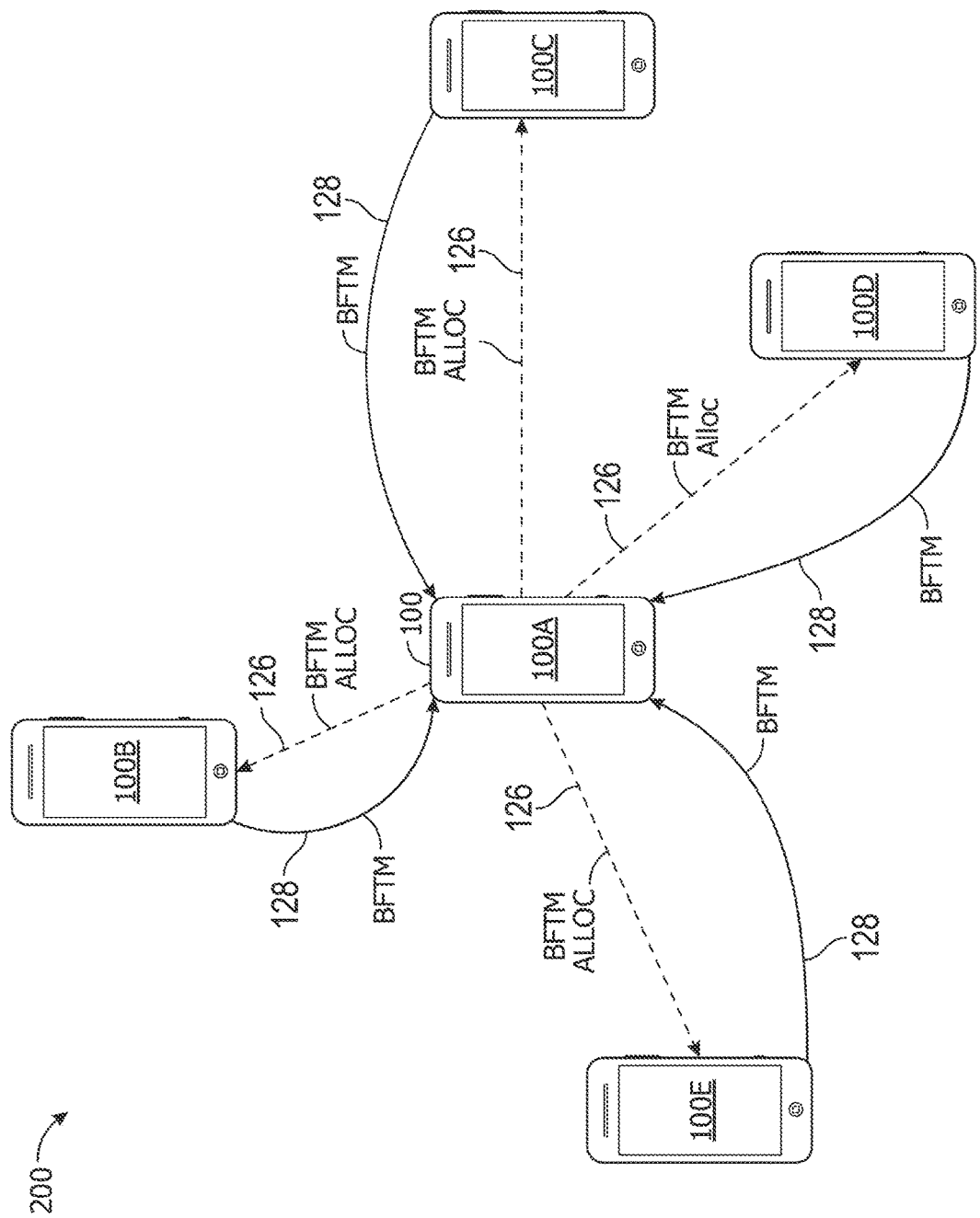
FIG. 2 illustrates a block diagram of mobile computing devices communicating BFTM messages.

FIG. 2 illustrates a block diagram of mobile computing devices 100 communicating BFTM allocation messages 126 and BFTM timing messages 128 in accordance with some examples disclosed herein. The depicted example shows five mobile computing devices 100A-E within a given area (e.g., inside a building, in a marketplace, passing along a street, etc.) and that wirelessly communicate with each other, either over a network 132 or point-to-point. Of course, the disclosed techniques may include more or fewer than five mobile computing devices 100. For purposes of the disclosure, and to aid the reader, the mobile computing device 100A that transmits the BFTM allocation message 126 is referenced as the "scheduling mobile computing device," and the mobile computing devices 100B-E that respond to the BFTM allocation message are referenced as the "responding mobile computing devices." In one example, the scheduling mobile computing device 100A is a group owner from a peer-to-peer group that acts as an initiator for transmitting the BFTM allocation message 126 that coordinates the order of responding mobile computing devices 100B-E transmitting the BFTM timing messages 128.

In some examples, location detection service are provided among the mobile computing devices 100A-E by the scheduling mobile computing device 100A initially and wirelessly broadcasting a BFTM allocation message 126 within a given broadcast area or radius, as shown by the dotted lines. Responding mobile computing devices 100B-E receive the BFTM allocation message 126, assign a TOA at the time of receipt of the BFTM allocation message 126, generate a BFTM timing message 128 to respond back with, and transmit the generated BFTM timing message 128 during the scheduled contention-free time period according to the scheduling instructions in the BFTM allocation message 126. For example, responding mobile computing device 100B may be designated to transmit its BFTM timing message 128 at time T2, responding mobile computing device 100C may be designated to transmit its BFTM timing message 128 at time T3, responding mobile computing device 100D may be designated to transmit its BFTM timing message 128 at time T4, and responding mobile computing device 100E may be designated to transmit its BFTM timing message 128 at time T5.

The illustrated example depicts only one scheduling mobile computing device 100A broadcasting a BFTM allocation message 126 and the responding mobile computing devices 100B-E responding back with BFTM timing messages 126. In some examples, each, or a subset, of the mobile computing devices 100A-E act as the scheduling mobile computing device 100 at different times, causing the other mobile computing devices 100 to responsively operate as responding mobile computing devices 100. For example, after the depicted transmission of BFTM timing messages 128 from mobile computing devices 100B-E in response to the BFTM allocation message 126 from mobile computing device 100A, mobile computing device 100B may act as the scheduling mobile computing device 100 by sending a BFTM allocation message 126 that causes mobile computing devices 100A and C-E to respond with BFTM timing messages 128. Similarly, mobile computing devices 100C-E may also operate—either in sequence (in some examples)— as the scheduling mobile computing device 100, causing the rest of the mobile computing devices 100A-E to respond with BFTM timing messages 128.

Focusing on the depicted example, the BFTM allocation message 126 includes a scheduling order that dictates timing periods for responding mobile computing devices A-E to transmit their respective BFTM timing messages 128. Mobile computing device 100A is included in the scheduling order, in some examples, because mobile computing device 100A may operate as both a scheduling mobile computing device 100 when sending the BFTM allocation message 126 and a responding mobile computing device 100 when sending a BFTM timing message 128. As previously discussed, the BFTM timing messages 128 may include a TOD, a TOA, and/or a propagation timing estimate associated with the responding mobile computing device 100's receipt of and response to the BFTM allocation message 126. Additionally or alternatively, the BFTM timing messages 128 may include identifiers of other mobile computing devices 100 (e.g., devices A and C-E) from which the responding mobile computing device 100 (e.g., device B) has previously received BFTM or FTM messages as well as corresponding TOAs, TODs, and/or propagation timing estimates of those previously received BFTM or FTM messages.

Such additional timing and propagation information from other mobile computing devices 100 may, in some examples, be included within a single BFTM timing message 128, reducing the need to transmit multiple messages from those other devices in order to convey such information and also extending the reach of information gathered at each mobile computing device 100. For example, a BFTM timing message 128 received by mobile computing device 100A from mobile computing device 100B that includes TOA, TOD, and propagation timing estimates for BFTM transmissions between mobile computing devices 100B and 100D provides mobile computing device 100A with information it would conventionally not be getting—i.e., timing and propagation information between devices B and D.

Moreover, the BFTM timing message 128 may also include TOA, TOD, and/or propagation timing estimates of another responding mobile computing device 100B-E's receipt of the BFTM allocation message 126 from the scheduling mobile computing device 100A. So, in some examples, device C communicates the propagation and timing information of device E's receipt of the BFTM allocation message 126 from device A, and this propagation and timing information is added to the BFTM timing message 128 from device C. Some examples may alternatively not communicate timing and/or propagation information of another mobile computing device 100's receipt of the BFTM allocation message 126, while still communicating exchanged BFTM timing messages 128 or FTM messages.

FIG. 3A illustrates one example of a BFTM allocation message 126. The BFTM allocation message 126 includes several frames 302-350B that individually include various octets of information. Octet quantities are provided above each frame. The illustrated BFTM allocation message 126 of FIG. 3 is but one example. Other examples may represent information in other binary, hexadecimal, or other formats; use different sets of octets; include different frames 302-350B than those illustrated; or rearrange the frames 302-350B in alternative sequences. To further illustrate the given example, the individual frames are discussed below. Not all of the shown frames 302-350B are included in all examples.

Frame control 302 indicates the type of frame being transmitted, which may include a designation for an acknowledgment (ACK) frame, a BFTM allocation frame 126, a BFTM timing frame 128, or some other type of frame. Duration 304 indicates the time or period of the BFTM allocation message 126. Receiver address 306 indicates a unique address (e.g., media access control or "MAC" address) of the destination mobile computing device 100 to receive the BFTM allocation frame 126, and transmitter address 308 indicates the scheduling mobile computing device 100 transmitting the BFTM allocation message 126. BSSID 310 identifies the network or a wireless access point (WAP) of the scheduling mobile computing device 100. Sequence control 312 indicates the sequence number of the BFTM allocation message 126. HT control field 314 indicates the type of message of the BFTM allocation message 126 (e.g., a management message indication). FCS 318 is a checksum value.

For the BFTM allocation message 126, action field 316 provides additional information relevant to the BFTM timing message 128, TODs, TOAs, and the like. Action field 316 includes the following field: category 320, BFTM action 322, BFTM dialog token 324, TOD 326, maximum TOD error 328, number of BFTM slots 330, BFTM slot duration 332, and the BFTM peer MAC addresses 334A of the responding mobile computing devices being scheduled. Category 320 and BFTM action 322 are implementation fields that designate the message as being a BFTM allocation message 126.

To allow multiple parallel BFTM operations from different subsets of mobile computing devices 100 to occur, BFTM dialog token used to uniquely identify a BFTM timing realization. Different BFTM dialog tokens 324 may be indicate different BFTM transactions. For example, one BFTM dialog token 324 may indicate BFTM operations occurring when the mobile computing device 100A is the scheduling mobile computing device 100. In some examples, multiple BFTM operations are occurring at the same time, so the BFTM dialog token 324 provides a way to distinguish between the BFTM operations. In some examples, BFTM timing messages 128 responding to one particular BFTM allocation message 126 with a given TOD 118 responds with different TOA values than BFTM timing messages responding to a completely different BFTM allocation message 126. Thus, using the BFTM dialog token 324 allows the mobile computing devices 100 to respond to any other mobile computing device 100 initiating BFTM operations.

For the BFTM allocation message 126, TOD 326 is the time of delivery of the BFTM allocation message 126 captured from the clock 106. Maximum TOD error 328 provides an estimation of the maximum TOD effort allotted to specific chipsets of the scheduling mobile computing device 100. Maximum TOD error 328 may be set by the manufacturer of chipsets at the PHY layer. In some examples, TOD 326 and Maximum TOD error 328 define the TOD and the maximum tolerable TOD measurement in multiples of 0.1 µs.

The number of BFTM slots 330 indicates the number of transmission slots scheduled for the mobile computing devices 100. Following the example shown in FIG. 2, a multiple (e.g., 1, 2, 3) of five slots may be indicated to account for the mobile computing devices 100A-E. For example, ten slots may be specified allowing each mobile computing device 100A-E to transmit a BFTM timing message 128. BFTM slot duration 332 indicates the time duration of the exclusive channel reservation for each BFTM transmission. Finally, a varying number of instances of BFTM peer MAC addresses 334A-N are provided to represent the MAC addresses of each mobile computing device 100 allocated by the BFTM allocation message 126 to transmit the BFTM timing messages 128. For example, mobile computing device 100B may be scheduled to transmit at time T2, mobile computing device 100C may be scheduled to transmit at time T3, mobile computing device 100E may be scheduled to transmit at time T4, mobile computing device 100A may be scheduled to transmit at time T5, mobile computing device 100B may be scheduled to transmit at time T6, mobile computing device 100C may be scheduled to transmit at time T7, and mobile computing device 100E may be scheduled to transmit at time T8, and mobile computing device 100A may be scheduled to transmit at time T9. In some examples, the scheduled order is repeated or reversed after the final time T9.

Other device identifiers may alternatively be used other than MAC addresses to identify the responding mobile computing devices 100. For example, a unique device identifier ("UDID"), universally unique identifier ("UUID"), IP address, user identifier ("user ID"), ID for advertisers ("IDFA"), and the like may alternatively be used instead of a MAC address in the BFTM allocation message 126—or, as discussed below, in the BFTM timing message 128.

In some examples, the scheduling order for the responding mobile computing devices 100A-C (or 100B-C) are indicated by the listing order of the BFTM peer MAC addresses 334A-N. The first BFTM peer MAC address 334A is designated as the first to transmit a BFTM timing message 128, the second BFTM peer MAC address 334B is the second, and so on. In this manner, and in some examples, the scheduling order comprises the listing order of the BFTM peer MAC addresses 334A-N, thereby designating when each corresponding mobile computing device 100A-N is to transmit BFTM timing messages 128. It should be noted again that the scheduling mobile computing device 100 may also be scheduled to transmit a BFTM timing message as a responding mobile computing device 100 by the scheduling order in addition to the scheduling mobile computing device 100's other operations of generating and transmitting the BFTM allocation message 126.

Alternatively, instead of representing the scheduling order by a listing of responding Peer MAC addresses 334A-N (or other device identifiers), some examples may additionally provide a ranking or order number along with each device identifier 334A-N. For example, UDIDs for stations A, B, C, D, and E may be listed sequentially in the BFTM allocation message 126 from A-E, but the stations may individually be associated with scheduled transmission order positions 1-5 in the following manner: station A(2), station B (5), station C (3), station D (1), and station E (4). Such an order correspondingly indicates a scheduling transmission order of station D, station A, station C, station E, and station B. Ranking identifiers may be indicated in any alphanumeric form (e.g., binary) either directly before or after each of the Peer MAC addresses 334A-N, or in other frames of the BFTM allocation message 126.

As for the channel access mechanism utilized for acquiring channel access rights for transmitting the BFTM allocation frame 126, three exemplary (but non-limiting) examples are disclosed herein. In the first example, the scheduling mobile computing device 100 contends regularly for gaining channel access via carrier sense multiple access with collision avoidance (CSMA/CA) techniques, as used in a distributed coordination function (DCF) mode. In a second example, a Request-To-Transmit/Clear-To-Transmit (RTS/CTS) frame exchange is performed between the scheduling and one or more responding mobile computing devices prior to the transmission of the BFTM allocation frame 126. This may be done to ensure or increase the odds that there will be no collisions for the transmission of the BFTM timing messages 128 and BFTM messages 132 by setting the network allocation vector (NAV) on the mobile computing device 100 to receive the RTS/CTS frames for the exact or nearly exact durations of the BFTM timing messages 128, BFTM messages 132, and perhaps (in some examples) some additional timing offset to provide enough time for transmission of both types of messages. In a third example, an a-priori negotiation initiated by the scheduling mobile computing device 100 is conducted among a subset of responding mobile computing devices 100 of interest as to define repeating fixed-duration time intervals during which all the mobile computing devices 100 involved (scheduling and responding) are scheduled to avoid accessing the channel (e.g., setting NAVs) and will wait for the transmission of the BFTM allocation message 126.

In alternative examples of the BFTM allocation message 126 aimed at reducing even further the signaling overhead, the BFTM peer MAC address field 334 is replaced by a "BFTM Peer Node ID" frame that indicates a node identifier for the mobile computing device 100 allocated for transmitting a BFTM timing message 128. The algorithm for node ID allocation of each mobile computing device 100 may vary in different instances and is beyond the scope of this disclosure.

One positive aspect about the reception of the BFTM allocation message 126 by any other mobile computing device 100 is that the Duration frame 304 in the BFTM allocation message 126 sets the NAV of responder mobile computing devices 100 for the duration of all subsequent BFTM slots 330 allocated, thus effectively creating a contention-free period. This allows each subsequent BFTM frame sent during the BFTM slots to not contend for accessing a transmission channel. In other words, the BFTM frames can be transmitted in a contention-free manner. As such, the BFTM measurement allocations determined by the BFTM allocation message 126 allow diminished signaling overhead and increased efficiency in dense deployment situations.

The illustrated frames of FIG. 3A are provided merely for explanatory purposes to illustrate two different example implementations. All implementations are not limited to the depicted frames. Alternative examples include additional and alternative frames without departing from the scope of this disclosure.

FIG. 3B illustrates one example of a BFTM timing message 128. The illustrated BFTM timing message 128 includes many of the same fields as the BFTM allocation message 126 shown in FIG. 3A, only from the perspective of a responding mobile computing device 100. Specifically, the depicted BFTM timing message 128 includes the following fields of information: frame control 302, duration 304, receiver address 306, transmitter address 308, BSSID 310, sequence control 312, HT control 314, action field 316, and FCS 318. Like the BFTM allocation message 126 discussed above relative to FIG. 3A, the BFTM timing message 128 includes the following fields of information in the action field 316: category 320, BFTM action 322, BFTM dialog token 324, TOD 326 (i.e., times of the BFTM timing message 128 instead of the BFTM allocation message 126), and maximum TOD error 328. The BFTM timing message 128 also includes: a number of BFTM reports 430; a maximum TOA error threshold 432; multiple BFTM reports 440A-N; a number of PTE reports 442; a maximum PTE error 444; and multiple PTE reports 446A-N.

Frame control 302 indicates the type of frame being transmitted, which may include a designation for an acknowledgment (ACK) frame, a BFTM timing frame 126, or some other type of frame. Duration 304 indicates the time or period of the BFTM timing message 128. Receiver address 306 indicates a unique address (e.g., MAC address) of the destination mobile computing device 100 to receive the BFTM allocation frame 126, and transmitter address 308 indicates the responding mobile computing device 100 transmitting the BFTM timing message 128. BSSID 310 identifies the network or a wireless access point (WAP) of the responding mobile computing device 100. Sequence control 312 indicates the sequence number of the BFTM timing message 128. HT control field 314 indicates the type of message of the BFTM timing message 128 (e.g., a management message indication). FCS 318 is a checksum value.

Looking at the action field 316 of the BFTM timing message 128, category 320 and BFTM action 322 are implementation fields that designate the message as being a BFTM timing message 128. BFTM dialog token 324 is used to uniquely identify the BFTM timing message 128, providing a way to distinguish the BFTM timing message 128 from other BFTM or FTM messages. In some examples, multiple BFTM operations are occurring at the same time, so the BFTM dialog token 324 provides a way to distinguish between the BFTM operations. BFTM timing messages 128 responding to one particular BFTM allocation message 126 with a given TOD 118 may respond with different timing and propagation values than BFTM timing messages 128 responding to a completely different BFTM allocation message 126.

For the BFTM timing message 128, TOD 326 is the time of delivery of the BFTM timing message 126 captured from the clock 106. Maximum TOD error 328 provides an estimation of the maximum TOD error allotted to specific chipsets of the responding mobile computing device 100. Maximum TOD error 328 may be set by the manufacturer of chipsets at the PHY layer. In some examples, TOD 326 and Maximum TOD error 328 define the TOD and the maximum tolerable TOD measurement in multiples of 0.1 µs.

The number of BFTM reports 430 and the number of PTE reports 442 respectively indicate a number of additional BFTM (or FTM) timing messages 126 and propagation timing estimates previously received by the responding mobile computing device 100 from other mobile computing devices 100. As previously discussed, the BFTM timing message 126 may include timing and propagation information from other responding or scheduling mobile computing devices 100. For example, station B may receive timing and propagation data of BFTM timing messages from stations C, D, and E. Such timing and propagation data is included in the BFTM report 440A-N and PTE report 446A-N frames, respectively, which are discussed in more detail below. The number of BFTM reports 430 and the number of PTE reports 442 indicate how many of these timing and propagation reports are included in the BFTM timing message 128.

Maximum TOD error 432 indicates the maximum tolerable TOD measurement error to be used for the TOD fields reported by this BFTM timing message 128. Such error may be chipset dependent or user-specified.

The BFTM reports 440A-N are provided to indicate the TOAs 120 of BFTM or FTM messages previously sent to or by other responding mobile computing devices 100. More specifically, the TOAs 444A-N may indicate the TOA of a previously sent FTM or BFTM message to another mobile computing device 100, either from the mobile computing device 100 sending the BFTM timing message 128 or another mobile computing device 100. For example, if station B is sending the BFTM timing message 128, the BFTM peer MAC address 442A may indicate station C and the corresponding TOA 444A may indicate the TOA at which station C received a message from either station B or stations A, D, or E. In an alternative example, if station B is sending the BFTM timing message 128, the BFTM peer MAC address 442A may indicate station C and the corresponding TOA 444A may indicate the TOA at which station B received a message from station C. So the BFTM reports 440 may indicate the TOAs 444 that a responding mobile computing device 100 sending the BFTM timing message 128 recorded when receiving BFTM or FTM messages from other mobile computing devices 100, the TOAs 444 of other mobile computing devices 100 receiving BFTM or FTM messages from the responding mobile computing device 100 sending the BFTM timing message 128, TOAs 444 of other mobile computing devices 100 receiving BFTM or FTM messages from still other mobile computing devices 100, or a combination thereof.

The BFTM timing frame 128 may also indicate a number of PTE reports 442, indicate a maximum PTE error 444, and include multiple PTE reports 446A-N, or some combination thereof. The number of PTE reports 442 determines the number of PTE reports 446 that are included in the BFTM timing message 128. The Maximum PTE report error 444 may indicate the maximum error (e.g., in multiples of 0.1 µs) for the PTEs in this BFTM timing message 128.

The PTE reports 446A-N may include identifiers of mobile computing devices 100 (PTE peer MAC addresses 460A-N) and corresponding PTEs 462A-N indicating the propagation times of previously sent BFTM or FTM messages relative to the identified responding mobile computing device 100 or other mobile computing devices 100. For example, stations C, D, and E may be identified by MAC address (or other identifier, such as an Internet Protocol address, or the like) in a BFTM timing message 128 of station B, corresponding PTEs 462 may be provided that indicate the respective propagation delays of stations C, D, and E with respect to station B or each other (e.g., between C and D, D and E, etc.). In some examples, PTEs 462A-N represent previously calculated PTEs between two mobile computing devices 100 based on TODs and TOAs of BFTM or FTM messages communicated between the two. By batching PTEs 462A-N in the BFTM timing messages 128, the number of messages needing to be exchanged to form a mapping of the locations of proximate mobile computing devices 100 can be reduced dramatically.

The illustrated frames of FIG. 3A are provided merely for explanatory purposes to illustrate two different example implementations. All implementations are not limited to the depicted frames. Alternative examples include additional and alternative frames without departing from the scope of this disclosure.

FIG. 4A is a timing diagram showing various mobile computing devices 100A-E communicating different BFTM messages 402-410 at times T1-T5. A scheduling mobile computing device 100A broadcasts a BFTM allocation message 126 (402) at time T1 that schedules a set of responding mobile computing devices 100B-E to transmit BFTM timing messages 128 or FTM messages (402-410) at times T2-T5.

In some examples, the illustrated pattern of transmissions 402-410 and corresponding times T1-T5 are scheduled in BFTM allocation message 126 (402) using the following messages fields: BFTM slots 328, BFTM slot duration 332, and the BFTM peer MAC addresses 334A-N. In particular, BFTM slots 328 specify the number of slots open for responding mobile computing devices 100A-E to individually transmit. BFTM slot duration 332 designates the amount of time for each to transmit, which may be a specific unit of time (e.g., 1 ns) or some multiple of time (e.g., two multiples of 0.1 µs). In some examples, the amount of time is uniform between all responding mobile computing devices 100B-E. In still other examples, the time varies (e.g., T2-T3 is different than T4-T5).

During their respectively scheduled BFTM transmission times, responding mobile computing devices 100A-E—device 100A may operate as both a scheduling and responding device 100—transmit a BFTM timing message 128 or FTM message that can be captured by the rest of the mobile computing devices 100A-E (in some examples) or just the scheduling mobile computing device 100A (in other examples). In some examples, the BFTM allocation message 126 includes an identifier for the response BFTM or FTM messages in order to associate the response messages to the BFTM allocation message 126.

Responsive BFTM timing messages 126 may include a TOA indicating when the responding mobile computing devices 100B-E received the BFTM allocation message 126 and a TOD for when the responsive BFTM timing message 128 was sent. Additionally, the BFTM timing message 128 may also include one or more TOAs and/or PTEs of other responding mobile computing devices 100 associated with previous communications with the responding mobile computing device 100 or between the other mobile computing devices 100 themselves. Specifically, these PTEs may indicate the propagation time required to communicate the BFTM allocation message 126 between the scheduling and responding mobile computing devices 100 (e.g., station A to stations B, C, D, or E), or communicate BFTM timing messages 128 (or FTM messages) between the responding computing devices 100 (e.g., stations B-E to stations E-B).

Figure 4B:
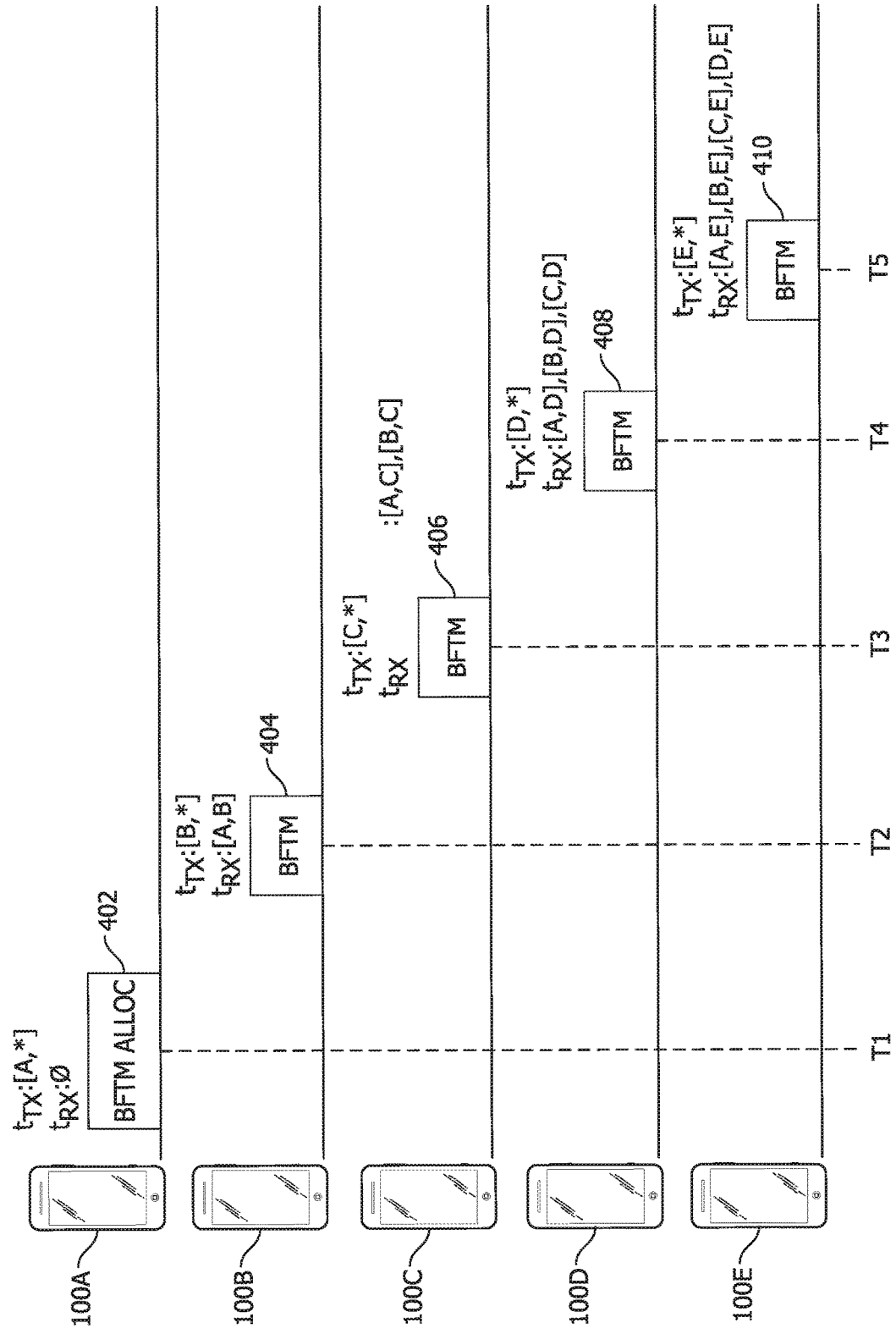
FIG. 4B is a timing diagram showing various mobile computing devices communicating different timing measurement messages at given times.

FIG. 4B illustrates various times associated with the BFTM messages 402-418 communicated between mobile computing devices 100A-E. The depicted messages illustrate the messages between two different mobile computing devices 100A-E that are received ($t_{RX}$ messages) and transmitted ($t_{TX}$ messages). The messages themselves indicate the two mobile computing devices 100A-E involved in the message transaction, with the transmitting device listed first and the receiving device listed second. As shown, mobile computing device 100A transmits BFTM allocation message 402 at time T1 (i.e., $t_{TX}[A,*]$) at which time it has received no other messages (i.e., $t_{RX}:0$). The BFTM allocation message 402 is received at responding mobile computing devices 100B-E, as shown by $t_{RX}[A,B]$ at device 100B;

$t_{RX}$[A,C] at device 100C; $t_{RX}$[A,D] at device 100D; and $t_{RX}$[A,E] at device 100E respectively at times T2, T3, T4, and T5, respectively.

In some examples, the mobile computing devices 100A-E transmit BFTM timing messages 404-418 at times T2-T5. The rest of the mobile computing devices 100A-E receive the BFTM timing messages 404-410 of the other mobile computing devices 100A-E and may include the timing an propagation information of from those messages in the mobile computing devices 100A-E's BFTM timing message. Specifically, the BFTM timing message 404 transmitted by mobile computing devices 100B includes the TOD, TOA, and/or PTE associated with the BFTM allocation message 402 received at the mobile computing device 100B. The BFTM timing message 406 transmitted by mobile computing device 100C includes the TODs, TOAs, and/or PTEs associated with the BFTM allocation message 402 from device 100A and the BFTM timing message 404 from device 100B received at the mobile computing device 100C. The BFTM timing message 408 transmitted by the mobile computing device 100D includes the TODs, TOAs, and/or PTEs associated with the BFTM allocation message 402 from device 100A and the BFTM timing messages 404 and 406 from devices B and C, respectively, received at the mobile computing device 100D. The BFTM timing message 410 transmitted by the mobile computing device 100E includes the TODs, TOAs, and/or PTEs associated with the BFTM allocation message 402 from device 100A and the BFTM timing messages 404, 406, and 408 from devices B, C, and D, respectively, received at the mobile computing device 100D.

FIG. 4C illustrates various times associated with the BFTM messages 402-418 communicated between mobile computing devices 100A-E. The depicted messages illustrate the messages between two different mobile computing devices 100 that are received ($t_{RX}$ messages) and transmitted ($t_{TX}$ messages). The messages themselves indicate the two mobile computing devices 100A-E involved in the message transaction, with the transmitting device listed first and the receiving device listed second. As shown, mobile computing device 100A transmits BFTM allocation message 402 at time T1 (i.e., $t_{TX}$[A,*]) at which time it has received no other messages (i.e., $t_{RX}$:0). The scheduling order in the BFTM allocation message schedules the mobile computing devices 100A-E to transmit BFTM timing message 128 (or standard FTM messages) in a forward sequence at times T1-T5 and a reverse sequence at times T6-T9.

More specifically, in some examples, the scheduling mobile computing device 100A ($S_1$) schedules all mobile computing devices 100B-E ($S_2$ to $S_{N-1}$, respectively) to transmit in a given sequence that includes a forward sequence of $A_{forward}=\{S_2, S_3, \ldots, S_{n-2}, S_{n-1}, S_n\}$, one after the other, and then continues scheduling all but the last scheduled mobile computing device 100E in reverse order, i.e., a reverse sequence of $A_{reverse}=\{S_{n-1}, S_{n-2}, \ldots, S_3, S_2\}$. The scheduling order concludes by scheduling itself (mobile computing device 100A or $S_1$) to transmit. As a result, such examples include a scheduling order comprising the forward and reverse sequence that make up $A=\{S_2, S_3, \ldots, S_{n-2}, S_{n-1}, S_n, S_{n-1}, S_{n-2}, \ldots, S_3, S_2, S_1\}$. By assembling such a specific scheduling order i, a complete graph of device locations for mobile computing devices 100A-E can be reduced from a quadratic complexity of messages to a linear complexity of messages.

In some examples, during the first half of scheduled BFTM transmissions (i.e., the forward sequence or $A_{forward}$), all scheduled mobile computing devices 100B-E have previously received the TOD 326 of the BFTM allocation message 126; otherwise, they would not have received the scheduling order itself, which is included in the BFTM allocation message 126. At this time, each receiving mobile computing device 100B-E, at its scheduled turn, may reply with a BFTM timing message 128 having its own TOD 326 and the TOA 452A of the BFTM allocation message 126, thus allowing the scheduling mobile computing device 100A that receives the BFTM timing message 128 to assemble a partial or complete graph of timing measurements from itself to all other mobile computing devices 100, and then, in some examples, determining a propagation time estimation between the scheduling mobile computing device 100A and the responding mobile computing device 100B-E.

Also, each replied BFTM timing message 128 in the sequence $A=\{S_2, S_3, \ldots S_{n-2}, S_{n-1}, S_n, S_{n-1}, S_{n-2} \ldots S_3, S_2\}$, in some examples, includes TOD information, which allows the other mobile computing devices 100 in the sequence to reply in piggyback at their turn on their BFTM frames with the respective TOA information for all other previous mobile computing devices 100 in the sequence, as well as their propagation time estimations for those mobile computing devices 100. Finally, because the scheduling mobile computing device 100A includes all TOD, TOA, and propagation time estimations for all other mobile computing devices 100, the scheduling mobile computing device 100A may, in some examples, assemble the complete graph of propagation timing estimates for deriving a complete graph of locations and distances between all mobile computing devices 100A-E.

In the reverse sequence, some examples will direct the responding mobile computing devices 100A-E to only piggyback the timing and propagation parameters in the transmissions of previously transmitted BFTM timing messages in the reverse sequence. As shown, mobile computing device 100D at time T6 transmits just the TOA or the BFTM timing message 128 from mobile computing device 100E, not timing and propagation parameters from the transmission in the forward sequence. Retransmitting the information from the forward sequence may unnecessarily duplicate the transmission of information, as such information would be transmitted twice. Therefore, at least some examples only retransmit BFTM timing information in the current sequence (i.e., forward or reverse) of transmission.

Figure 5:
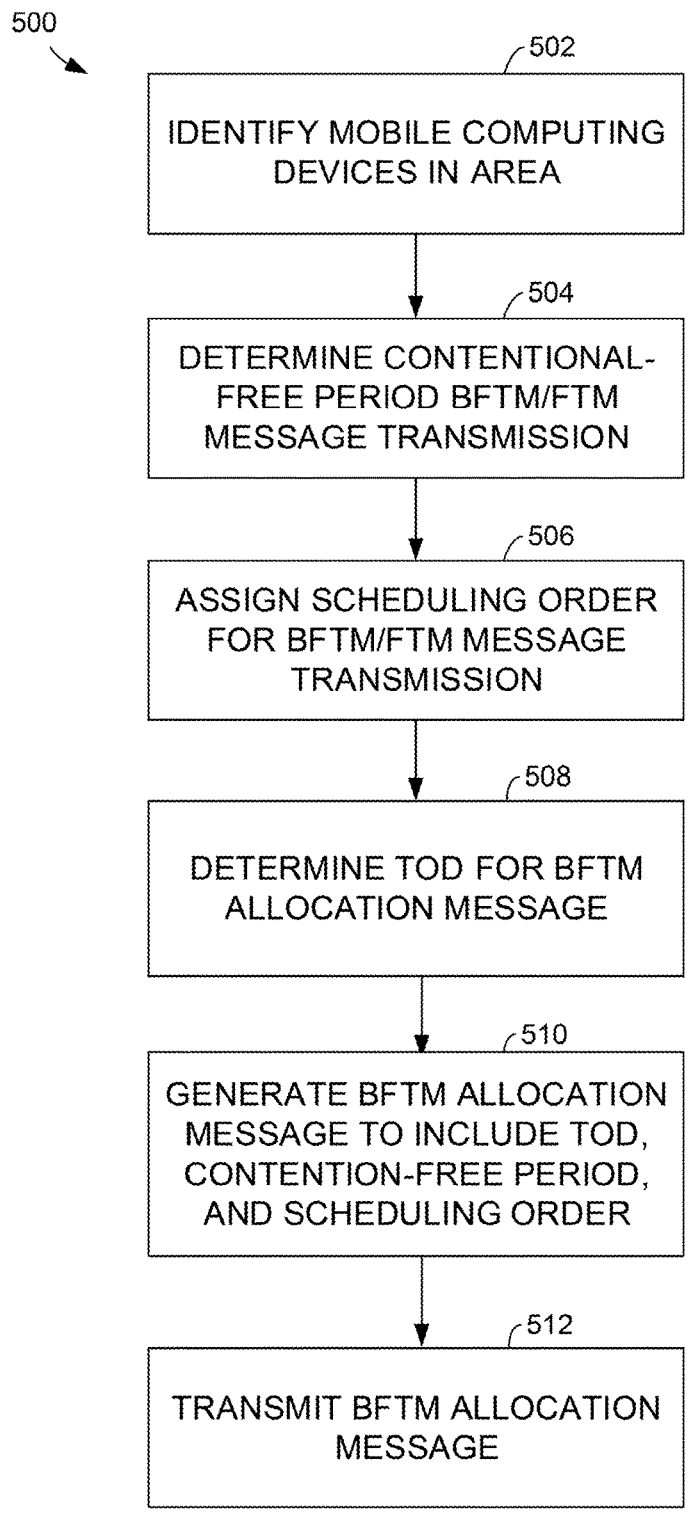
FIG. 5 is a flow chart diagram illustrating a work flow for generating a BFTM allocation message.

FIG. 5 is a flow chart diagram illustrating a work flow 500 for generating a BFTM allocation message 126. According to work flow 500, a scheduling mobile computing device 100 identifies responding mobile computing devices in a particular area, such as an indoor building, as shown at block 502. The scheduling mobile computing device 100 generates a BFTM allocation message 126 in the following manner. A contention-free period for timing measurement messages (BFTM or FTM) is determined by the scheduling mobile computing device 100, as shown at block 504. A scheduling order for the responding mobile computing devices 100 to transmit the timing measurement messages is determined by the scheduling mobile computing device 100, as shown at block 506. In some examples, a TOD for the BFTM allocation message is determined from a clock of the scheduling mobile computing device 100 just prior (e.g., within milliseconds, nanoseconds, etc.) to transmission of the BFTM allocation message 126 to avoid extra delays incurred by processing, as shown at block 508. The BFTM allocation message with frames indicating the TOD, scheduling order, and the contention-free period is then generated and transmitted to the responding computing devices 100, as shown at blocks 510 and 512, respectively.

Figure 6:
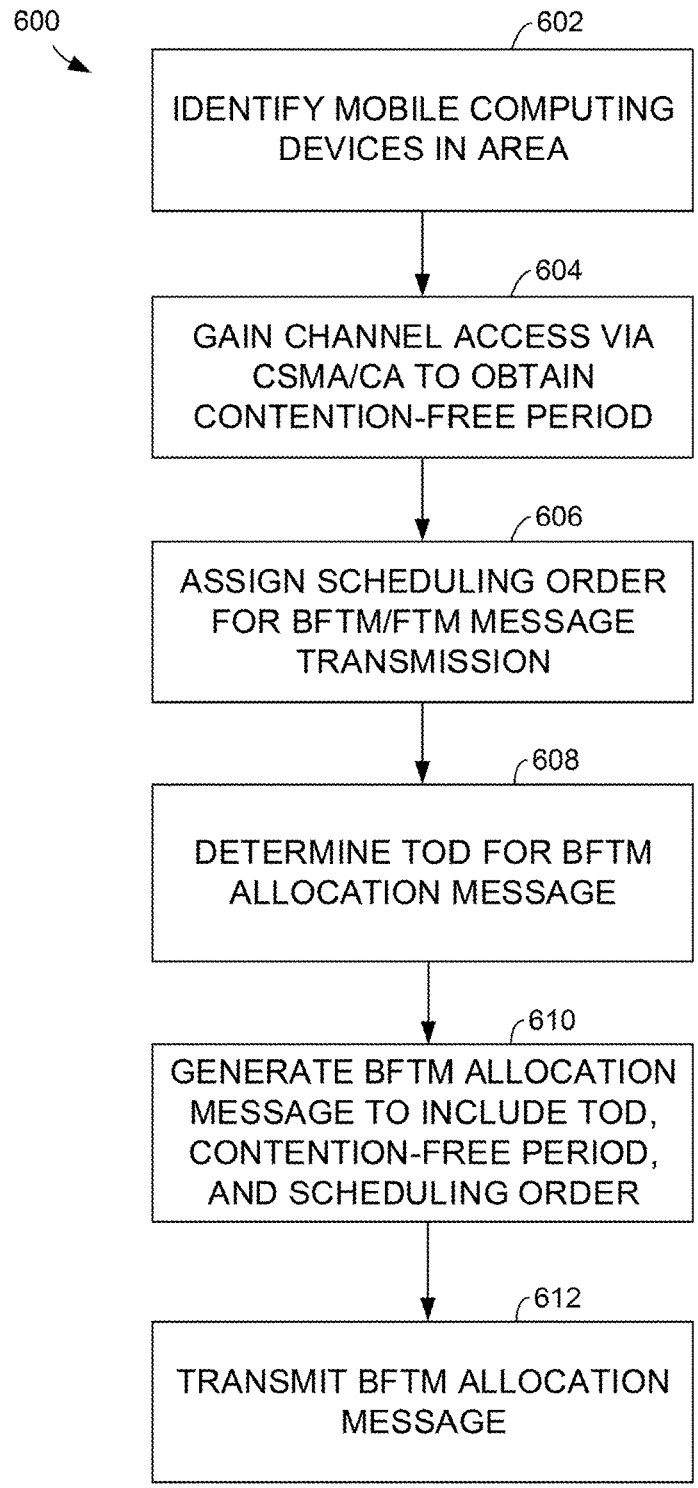
FIG. 6 is a flow chart diagram illustrating a work flow for generating a BFTM allocation message.

FIG. 6 is a flow chart diagram illustrating a work flow 600 for generating a BFTM allocation message 126. According to work flow 600, mobile computing devices are identified in a particular area by a scheduling mobile computing device 100, as shown at block 602. The scheduling mobile computing device 100 generates a BFTM allocation message 126 in the following manner. The scheduling mobile computing device 100 gains access via CSMA/CA to obtain a contention-free period for the other mobile computing devices to transmit timing measurement messages (BFTM or FTM), as shown at block 604. A scheduling order for the responding mobile computing devices 100 to transmit the timing measurement messages is assigned by the scheduling mobile computing device 100, as shown at block 606. A TOD for the BFTM allocation message is determined from a clock of the scheduling mobile computing device 100 just prior to transmission of the BFTM allocation message 126, as shown at block 608. The BFTM allocation message with frames indicating the TOD, the contention-free period, and the scheduling order is generated and transmitted to the responding computing devices 100, as shown at blocks 610 and 612, respectively.

Figure 7:
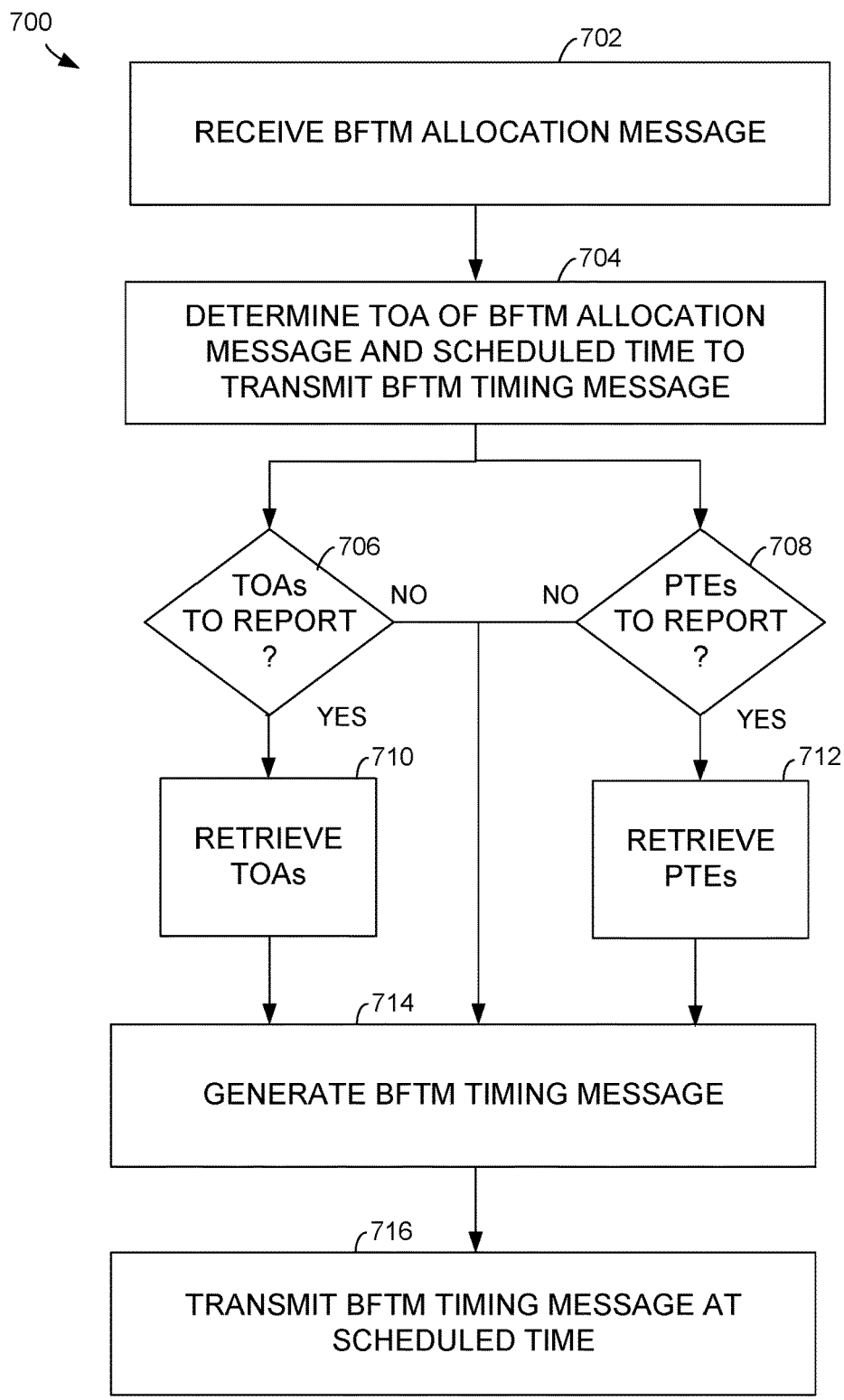
FIG. 7 is a flow chart diagram illustrating a work flow for generating a BFTM timing message.

FIG. 7 is a flow chart diagram illustrating a work flow 700 for generating a BFTM timing message 128. A responding mobile computing device 100 receives a BFTM allocation message 126 from a scheduling mobile computing device 100, as shown at block 702. From the BFTM allocation message 126, the responding mobile computing device 100 accesses a scheduling order. From the scheduling order, the responding mobile computing device 100 determines a scheduled future time to transmit a BFTM timing message 128, as shown at block 704.

The responding mobile computing device 100 determines whether any TOAs or PTEs in other previously received BFTM or FTM messages need to be included in the BFTM timing message 128, as shown at decision blocks 706 and 708, respectively. If so, the TOAs and PTEs are retrieved from storage on the responding mobile computing device 100. as shown at blocks 710 and 712, respectively, and included in the BFTM timing message generated by the responding mobile computing device 100, as shown at block 714. Corresponding device identifiers (e.g., MAC, IP, or the like) may also be included to indicate devices associated with the retrieved TOAs and PTEs. Additionally or alternatively, a TOD for the BFTM timing message 128 is also determined. Though not shown for clarity, TODs of the previous BFTM timing messages 128 that provided the additional TOAs and PTEs being added to the current BFTM timing message 128 may also be included. Once generated, the BFTM timing message 128 is transmitted at the scheduled time to the other mobile computing devices 100 in the area, as indicated at block 716.

Figure 8:
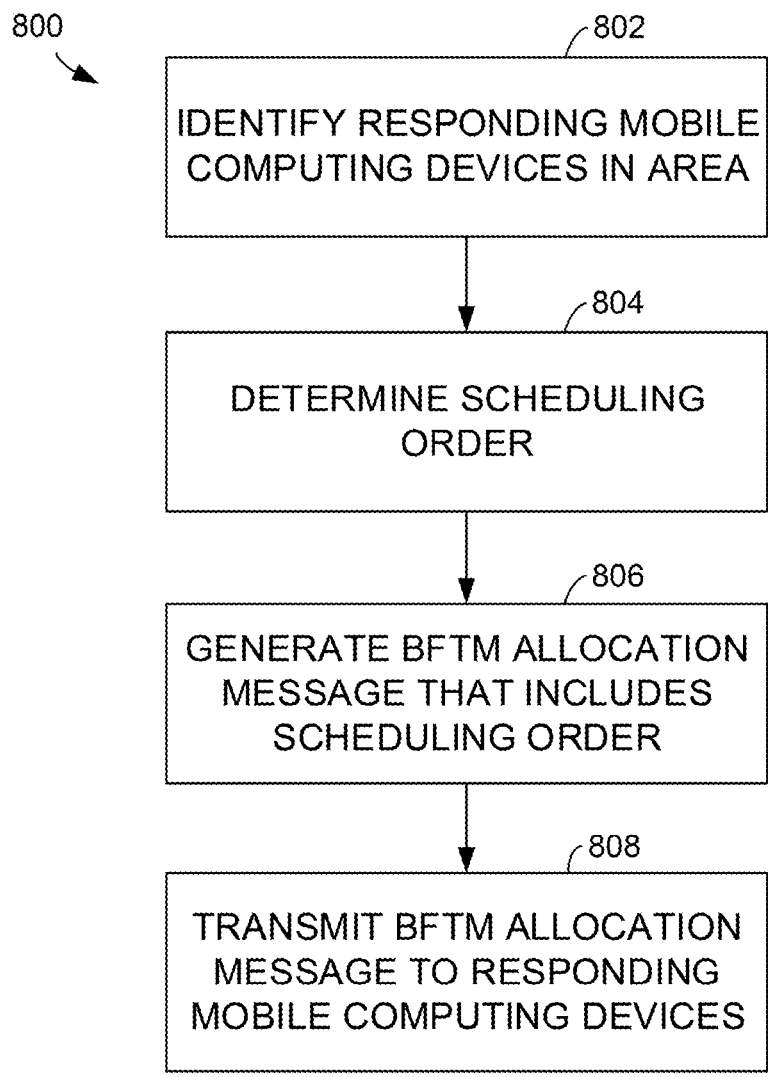
FIG. 8 is a flow chart diagram illustrating a work flow for generating a BFTM allocation message with a scheduling order.

FIG. 8 is a flow chart diagram illustrating a work flow 800 for generating a BFTM allocation message 126 with a scheduling order. Initially, responding mobile computing devices 100 are identified in a given area by a scheduling mobile computing device 100, as shown at block 802. The responding mobile computing devices 100 may be identified in any of the disclosed techniques mentioned herein. Once identified, a scheduling order is determined for the responding mobile computing devices 100 to transmit BFTM timing messages 128, as indicated at block 804. The scheduling order may take into account the probable or actual locations of the responding mobile computing devices 100, may organize the responding mobile computing devices 100 to transmit BFTM timing messages 128 in a forward and reverse sequence order, and may designate particular contention-free periods for the responding mobile computing devices 100 to transmit their respective BFTM timing messages 128. Once determined, the scheduling order is added to a BFTM allocation message 126, as shown at block 806. In some examples, the scheduling order is indicated in the BFTM allocation message 126 through a sequence of device identifiers (e.g., MAC addresses, IP address, UDIDs, user IDs, IDFAs, etc.) organized according in the forward or reverse order. The BFTM allocation message 126 with the scheduling order is transmitted to the responding mobile computing devices 100, as shown at shown at block 808.

Figure 9:
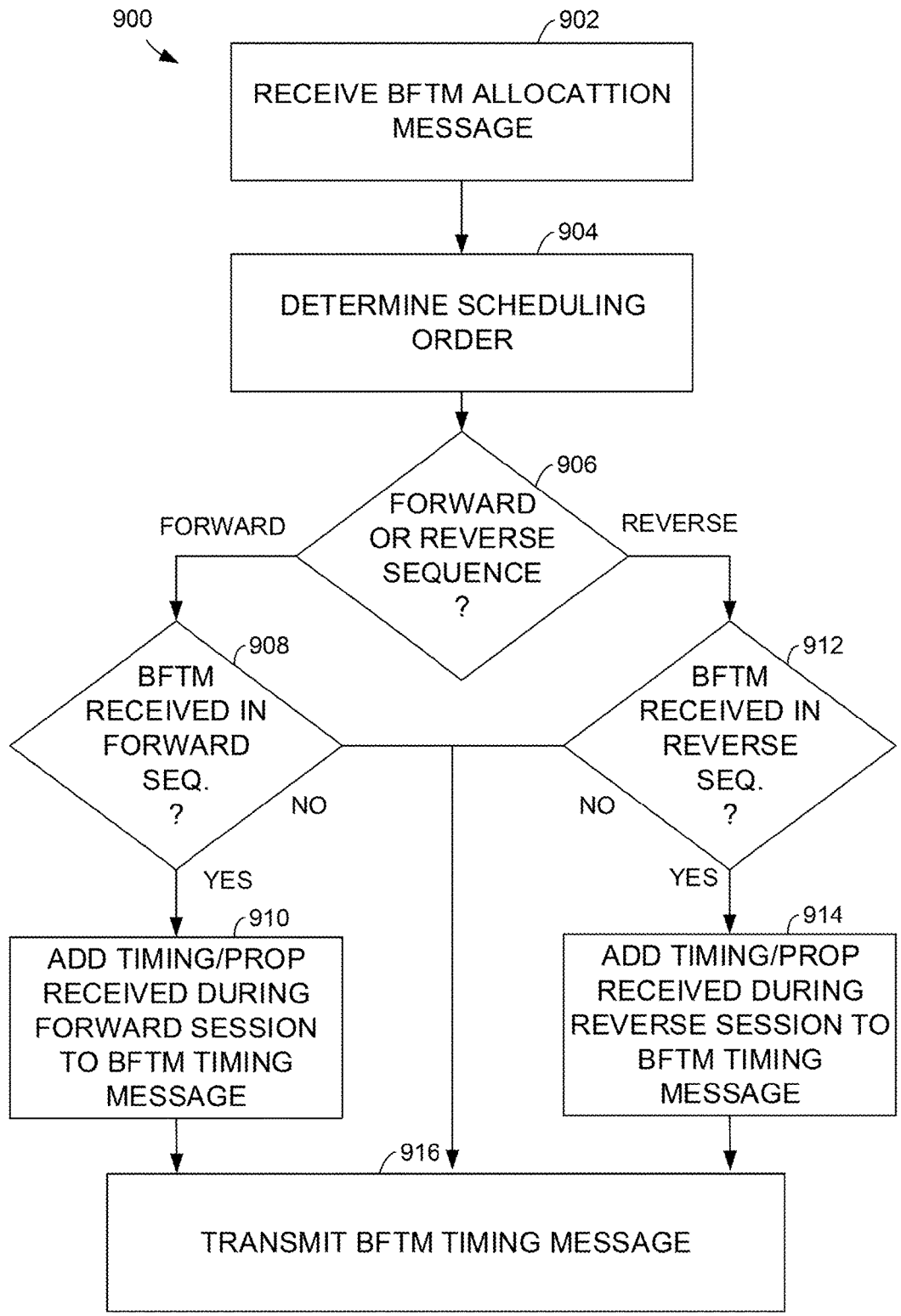
FIG. 9 is a flow chart diagram illustrating a work flow for transmitting BFTM timing messages according to a scheduling order in a BFTM allocation message.

FIG. 9 is a flow chart diagram illustrating a work flow 900 for transmitting BFTM timing messages according to a scheduling order in a BFTM allocation message. As shown at block 802, a responding mobile computing device 100 receives the BFTM allocation message 802. The responding mobile computing device 100 determines the scheduling order from the BFTM allocation message, as shown at block 804. In some examples, the scheduling order is conveyed to the responding mobile computing device as a sequence of device identifiers—e.g., station C identifier, station B identifier, station D identifier, and so forth. In other examples, order identifiers or rankings are provided in the BFTM allocation message 126 to indicate the order of transmission. The set of responding mobile computing devices 100 identified in the scheduling order begin to transmit BFTM timing messages 128 at their assigned times.

While the responding mobile computing devices 100 are transmitting, in some examples, each responding mobile computing device 100 may monitor or otherwise determine whether a forward ($A_{forward}$) or reverse ($A_{reverse}$) sequence of transmissions is occurring, as shown at decision block 906. In forward sequences, the responding mobile computing device 100 checks whether and BFTM messages (timing or allocation) have been received during the forward sequence.

If so, the timing and propagation information in those BFTM messages are added to a newly generated BFTM timing message, as shown at block 810. And the newly generated BFTM timing message 128 with the timing and propagation information from previously received BFTM messages is transmitted 816 to the other responding and scheduling mobile computing devices 100 at the scheduled time. Similarly, during reverse sequences, the timing or propagation information from received BFTM or FTM messages during the reverse sequence are added to a newly generated timing message, as shown at block 814. And the newly generated BFTM timing message 128 with the timing and propagation information from previously received BFTM messages is transmitted 816 to the other responding and scheduling mobile computing devices 100 at the scheduled time.

In some examples, the operations illustrated in FIGS. 5-9 may be implemented as software instructions encoded on computer-storage media (e.g., memory), in hardware programmed or designed to perform the operations, or both. For example, aspects of the disclosure may be implemented as an SoC or other circuitry including a plurality of interconnected, electrically conductive elements.

Figure 10:
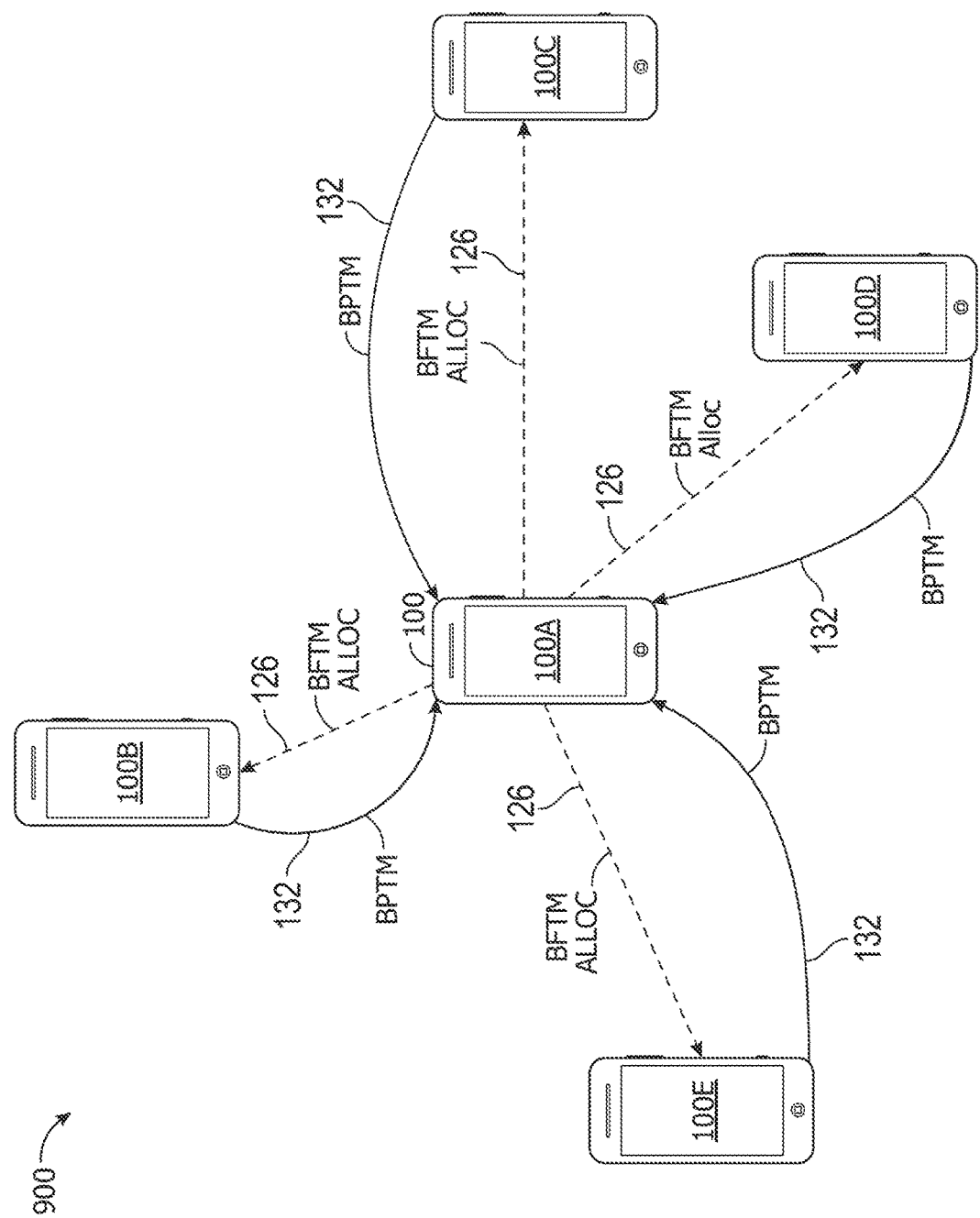
FIG. 10 illustrates a block diagram of mobile computing devices communicating BFTM messages.

FIG. 10 illustrates a block diagram of mobile computing devices 100 communicating BFTM messages 132. The depicted example shows five mobile computing devices 100A-E within a given area (e.g., inside a building, in a marketplace, passing along a street, etc.) and that wirelessly communicate with each other, either over a network 132 or point-to-point. Of course, the disclosed techniques may include more or fewer than five mobile computing devices 100. The mobile computing device 100A is shown as scheduling mobile computing device, and the mobile computing devices 100B-E are responding mobile computing devices that responsively transmit BFTM messages 132—either alone or along with BFTM timing messages 128.

In some examples, location detection service are provided among the mobile computing devices 100A-E by the scheduling mobile computing device 100A initially and wirelessly broadcasting a BFTM allocation message 126 within a given broadcast area or radius, as shown by the dotted lines. Responding mobile computing devices 100B-E receive the BFTM allocation message 126, capture the TOA of the BFTM allocation message 126, generate a BFTM message 132 (either separately or in addition to a BFTM timing message 128) for response, and transmit the generated BFTM message 132 during the scheduled contention-free time period, according to the scheduling instructions in the BFTM allocation message 126. For example, responding mobile computing device 100B may be designated to transmit its BFTM message 132 at time T2, responding mobile computing device 100C may be designated to transmit its BFTM message 132 at time T3, responding mobile computing device 100D may be designated to transmit its BFTM message 132 at time T4, and responding mobile computing device 100E may be designated to transmit its BFTM message 132 at time T5.

The illustrated example depicts only one scheduling mobile computing device 100A broadcasting a BFTM allocation message 126 and the responding mobile computing devices 100B-E responding back with BFTM messages 132. In some examples, each, or a subset, of the mobile computing devices 100A-E act as the scheduling mobile computing device 100 at different times, causing the other mobile computing devices 100 to responsively operate as responding mobile computing devices 100.

The BFTM message 132 may also be used to report propagation times between a transmitting mobile computing device 100 and other responding mobile computing devices 100. For example, a BFTM message 132 from station B to station A may include the propagation times of previously transmitted messages between stations B and C, B and D, or B and E. In other words, while some examples generate and transmit BFTM messages 132 to include propagation timing information between other mobile computing devices 100, the BFTM messages 100 may additionally or alternatively include propagation timing information about its transmitting mobile computing device 100.

In some examples, the BFTM allocation message 126 includes a scheduling order that dictates timing periods for responding mobile computing devices 100A-E to transmit BFTM messages 132. Mobile computing device 100A is indicated in the scheduling order, in some examples, because mobile computing device 100A may operate as both a scheduling mobile computing device 100 when sending the BFTM allocation message 126 and a responding mobile computing device 100 when sending a BFTM timing message or BFTM message 132. In some examples, the BFTM messages 132 include pairs of device identifiers of mobile computing devices 100 and propagation timing information for previous BFTM, FTM, or BFTM messages communicated between the pairs of mobile computing devices 100. For example, mobile computing device 100B may include in a generated a BFTM message 132 the propagation times associated with BFTM timing messages 128 transmitted to mobile computing device 100C, the propagation times associated with BFTM timing messages 128 transmitted between mobile computing devices 100D and 100E, and the propagation times associated with FTM messages transmitted between mobile computing devices 100E and 100A. Thus, the BFTM messages 132 may indicate pairs of mobile computing devices 100 and propagations times or estimates for previously communicated messages between pairs of mobile computing devices 100.

Communicating propagation information from other mobile computing devices 100 within a single BFTM message 132 reduces the need to transmit multiple messages from those other mobile computing devices 100 in order to convey propagation information. This effectively extends the reach of information gathered at each mobile computing device 100. For example, a BFTM message 132 received by mobile computing device 100A from mobile computing device 100B that includes propagation times for BFTM, BFTM, or FTM transmissions between mobile computing devices 100C and 100D provides mobile computing device 100A with information it would conventionally not be receiving—i.e., timing and propagation information between devices 100C and 100D.

Channel access for transmitting the BFTM message 132 may be negotiated in any number of ways. In some examples, the BFTM message 132 may be transmitted within the duration of a given BFTM slot allocated by the BFTM allocation message 126. For purposes of this disclosure, a "time frame" refers to a time period in which a mobile computing device 100 is scheduled to transmit a BFTM timing message 128 or a FTM message, as previously discussed. These time frames are used, in some examples, by the mobile computing devices 100 to also or alternatively transmit BFTM messages 132. In some examples, time frames are protected by a set NAV, ensuring that the BFTM message 132 does not have to contend for accessing a particularly reserved channel. As such, the mobile computing device 100 transmitting the BFTM message 132 may only have to wait for the start of the respective time frame to transmit the BFTM message 132.

In other examples, BFTM messages 132 are not scheduled to be transmitted by the scheduling order of a BFTM allocation message 126. In such examples, NAV protection is not guaranteed, and mobile computing device 100 transmitting the BFTM message 132 contends for channel access to transmit using CSMA/CA requests—and subsequent assignments. CSMA/CA requests may be submitted to a network access controller, which in turn assigns the channel accordingly to the requesting mobile computing device 100.

The BFTM message 132 allows reporting multiple propagation times at once, thus increasing messaging efficiency, which is imperative in dense deployment scenarios.

Figure 11:
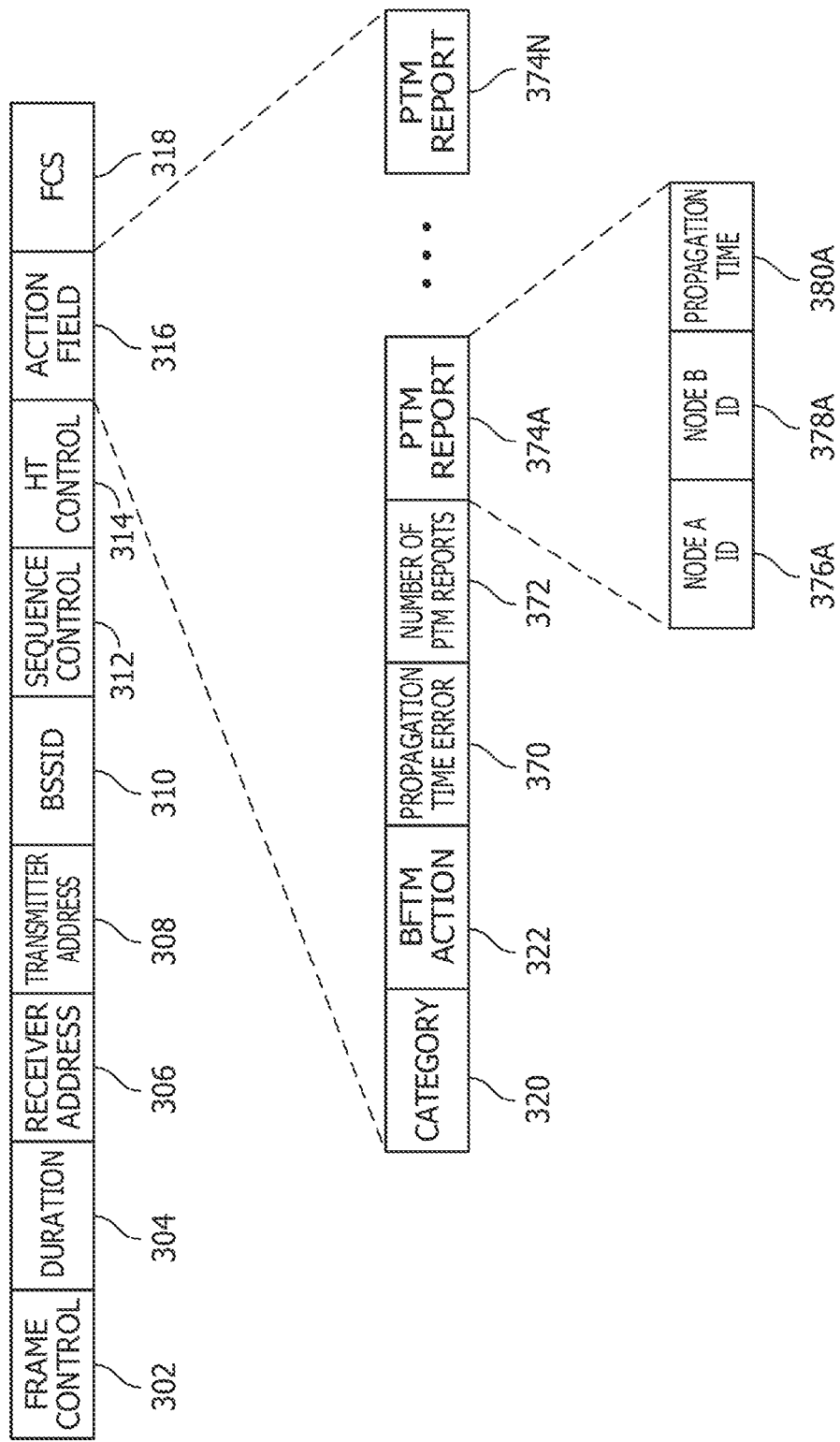
FIG. 11 illustrates an exemplary BFTM message.

FIG. 11 illustrates an exemplary BFTM message 132. The illustrated BFTM message 132 includes many of the same fields as the BFTM allocation message 126 and the BFTM timing message 126 shown in FIGS. 3A and 3B, respectively. Specifically, the depicted BFTM message 132 includes the following fields of information: frame control 302, duration 304, receiver address 306, transmitter address 308, BSSID 310, sequence control 312, HT control 314, action field 316, and FCS 318. Like the BFTM allocation message 126 and the BFTM timing message 128 discussed above, the BFTM message 132 includes the following fields of information in the action field 316: category 320 and BFTM action 322. The BFTM message 132 also includes a propagation time error 370, number of propagation time management (PTM) reports 372, and individual PTM reports 374A-N.

Frame control 302 indicates the type of frame being transmitted, which may include a designation for an acknowledgment (ACK) frame, a BFTM timing frame 126, or some other type of frame. Duration 304 indicates the time or period of the BFTM timing message 128. Receiver address 306 indicates a unique address (e.g., MAC address) of the destination mobile computing device 100 to receive the BFTM allocation frame 126, and transmitter address 308 indicates the responding mobile computing device 100 transmitting the BFTM message 132. BSSID 310 identifies the network or a wireless access point (WAP) of the responding mobile computing device 100. Sequence control 312 indicates the sequence number of the BFTM timing message 128. HT control frame 314 indicates the type of message of the BFTM message 132 (e.g., a management message indication). FCS 318 is a checksum value.

Looking at the action field 316 of the BFTM message 132, category 320 and BFTM action 322 are implementation fields that designate the message as being a BFTM message 132. Propagation time error 370 defines a maximum tolerable propagation time error for the propagation times 380 in the PTM reports 374. In some examples, such error is expressed as a multiple of 0.1 µs. The number of PTM reports indicates the number of propagation time management ("PTM") reports to be reported in the BFTM timing message 132. The PTM reports 372 each include, in some examples, two separate node identifiers 376 and 378 (shown as Node A ID 375A and Node B ID 378A) indicating two different mobile computing devices 100, and corresponding propagation times 380 of previously transmitted BFTM, FTM, or BFTM messages between the two listed mobile computing devices 100. The node identifiers 376, 378 may include any device identifier, such as those discussed herein, for example but without limitation, including a MAC address, an IP address, a UDID, a UUID, a user ID, an IDFA, or the like. The propagation times 380A-N respectively indicate the time of propagating messages between the mobile computing devices 100 identified by the node IDs 376A-N and 378A-N. For example, propagation time 380A may indicate the time it took to communicate previously transmitted BFTM, FTM, or BFTM messages between Node A ID 376A and node B ID 378A. Listing the propagation times of communicating messages between other mobile computing devices provides information a receiving mobile computing device 100 needs to map—either partially or completely—the mobile computing devices 100 in area.

Figure 12:
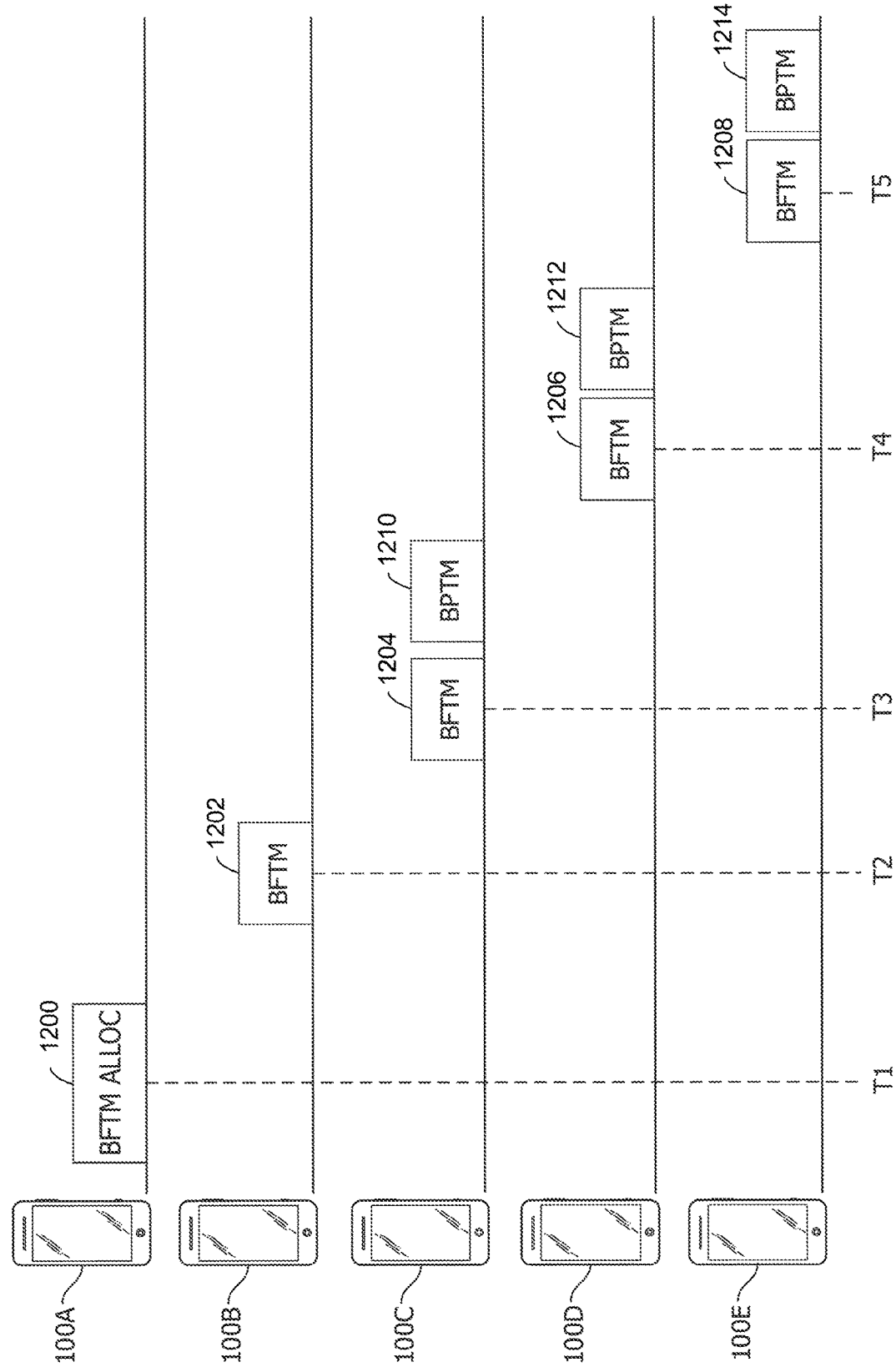
FIG. 12 is a timing diagram showing various mobile computing devices communicating allocation, timing, and propagation messages.

FIG. 12 is a timing diagram showing various mobile computing devices 100A-E communicating a BFTM allocation message 1200, BFTM timing messages 1202-1208, and BFTM messages 1210-1214 at given times T1-T5. BFTM allocation message 1200 may include any of the BFTM allocation message 126 parameters disclosed herein. BFTM timing messages 1202-1208 may include any of the BFTM timing message 128 parameters disclosed herein. BFTM messages 1210-1214 are different instances of the BFTM messages 132 disclosed herein. In some examples, the BFTM allocation message 1200 includes a scheduling order specifying mobile computing device 100B is scheduled to transmit at T2, mobile computing device 100C is scheduled to transmit at T3, mobile computing device 100D is scheduled to transmit at T4, and mobile computing device 100E is scheduled to transmit at T5. During those times, the mobile computing devices may transmit BFTM timing messages 1202-1208 and/or BFTM messages 1210-1214.

In some examples, the illustrated pattern of transmissions and corresponding times T1-T5 are scheduled in BFTM allocation message 126 (1200) using the following messages frames: BFTM slots 328, BFTM slot duration 332, and the BFTM peer MAC addresses 334A-N. In particular, BFTM slots 328 specify the number of time frames open for responding mobile computing devices 100A-E to individually transmit. BFTM slot duration 332 designates the amount of time in time frames for each mobile computing device 100A-E. More specifically, the BFTM slot duration 332 may be a specific unit of time (e.g., 1 ns) or some multiple of time (e.g., two multiples of 0.1 µs). In some examples, time frames are uniform between all responding mobile computing devices 100B-E. In still other examples, the time frames vary (e.g., T2-T3 is different than T4-T5).

Figure 13:
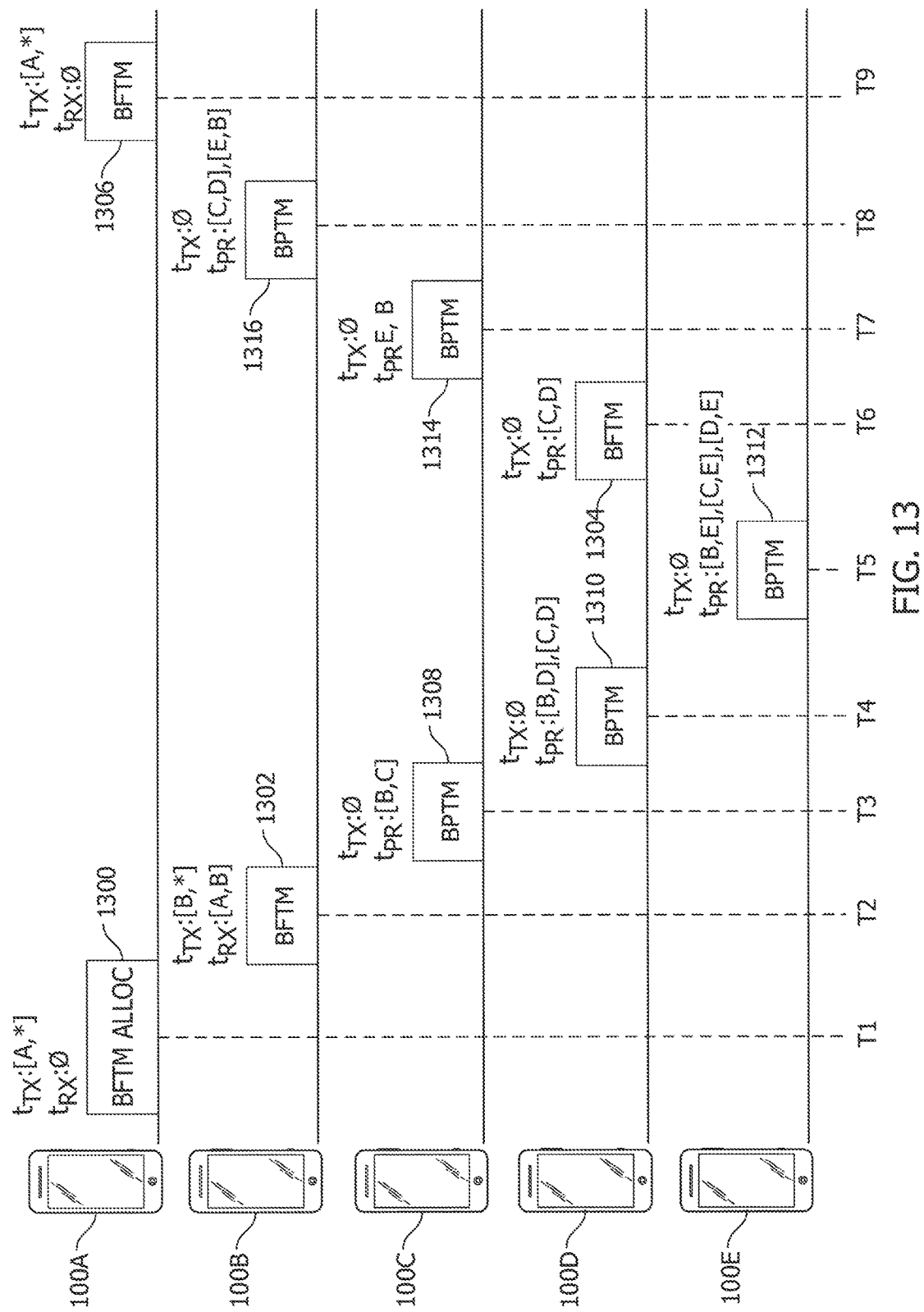
FIG. 13 is a timing diagram showing various mobile computing devices communicating BFTM timing messages, BFTM timing messages, and BFTM messages according to a scheduled order indicated in a BFTM allocation message.

FIG. 13 is a timing diagram showing various mobile computing devices 100A-E communicating a BFTM allocation message 1300, BFTM timing messages 1302-1306, and BFTM messages 1308-1316 at given times T1-T9. The various BFTM timing messages 1302-1306 include transmission TODs ($t_{TX}$ messages) of the BFTM timing messages 1302-1306 and also TOAs ($t_{RX}$ messages) indicating when the various mobile computing devices 100 received previous FTM, BFTM, or BFTM messages from the other mobile computing devices 100. The BFTM messages 1308-1316 may indicate the propagation times ($t_{PR}$ messages) indicating the propagation times for messages communicated between pairs of mobile computing devices 100. The $t_{PR}$ messages may include propagation times for messages received by the BFTM message-generating mobile computing device 100 or propagation times for messages between other mobile computing devices 100.

As shown, mobile computing device 100A transmits BFTM allocation message 1300 at time T1 (i.e., $t_{TX}[A,*]$) at which time it has received no other messages (i.e., $t_{RX}$:0). The scheduling order in the BFTM allocation message 1300 schedules the mobile computing devices 100A-E to transmit BFTM timing messages 1302-1306 and BFTM messages 1308-1316 128 in a forward sequence at times T1-T5 and a reverse sequence at times T6-T9.

More specifically, in some examples, the scheduling mobile computing device 100A ($S_1$) schedules all mobile computing devices 100B-E ($S_2$ to $S_{N-1}$, respectively) to transmit BFTM timing messages 128 or BFTM messages 132 in a given sequence that includes a forward sequence of $A_{forward}=\{S_2, S_3, \ldots, S_{n-2}, S_{n-1}, S_n\}$, one after the other, and then continues scheduling all but the last scheduled mobile computing device 100E in reverse order, i.e., a reverse sequence of $A_{reverse}=\{S_{n-1}, S_{n-2}, \ldots, S_3, S_2\}$. The scheduling order concludes by scheduling itself (mobile computing device 100A or $S_1$) to transmit. As a result, such examples include a scheduling order comprising the forward and reverse sequence that make up $A=\{S_2, S_3, \ldots, S_{n-2}, S_{n-1}, S_n, S_{n-1}, S_{n-2}, S_3, S_2, S_1\}$. By assembling such a specific scheduling order i, a complete graph of device locations for mobile computing devices 100A-E can be reduced from a quadratic complexity of messages to a linear complexity of messages.

In some examples, during the first half of scheduled transmissions (i.e., the forward sequence or $A_{forward}$), all scheduled mobile computing devices 100B-E have previously received the TOD 326 of the BFTM allocation message 126; otherwise, they would not have received the scheduling order itself, which is included in the BFTM allocation message 126. At this time, each receiving mobile computing device 100B-E, at its scheduled turn, may reply with a BFTM timing message 128 having its own TOD 326 and the TOA 452A of the BFTM allocation message 126, thus allowing the scheduling mobile computing device 100A that receives the BFTM timing message 128 to assemble a partial or complete graph of timing measurements from itself to all other mobile computing devices 100, and then, in some examples, determining a propagation time estimation between the scheduling mobile computing device 100A and the responding mobile computing device 100B-E. Additionally or alternatively, the mobile computing devices 100B-E may respond with BFTM messages 132 listing propagation times for previous messages (e.g., BFTM, FTM, or BFTM) communicated between pairs of mobile computing devices 100A-E. Mobile computing devices 100A-E may transmit a BFTM message 132, or a BFTM timing message 128, or both during scheduled time frames.

Figure 14:
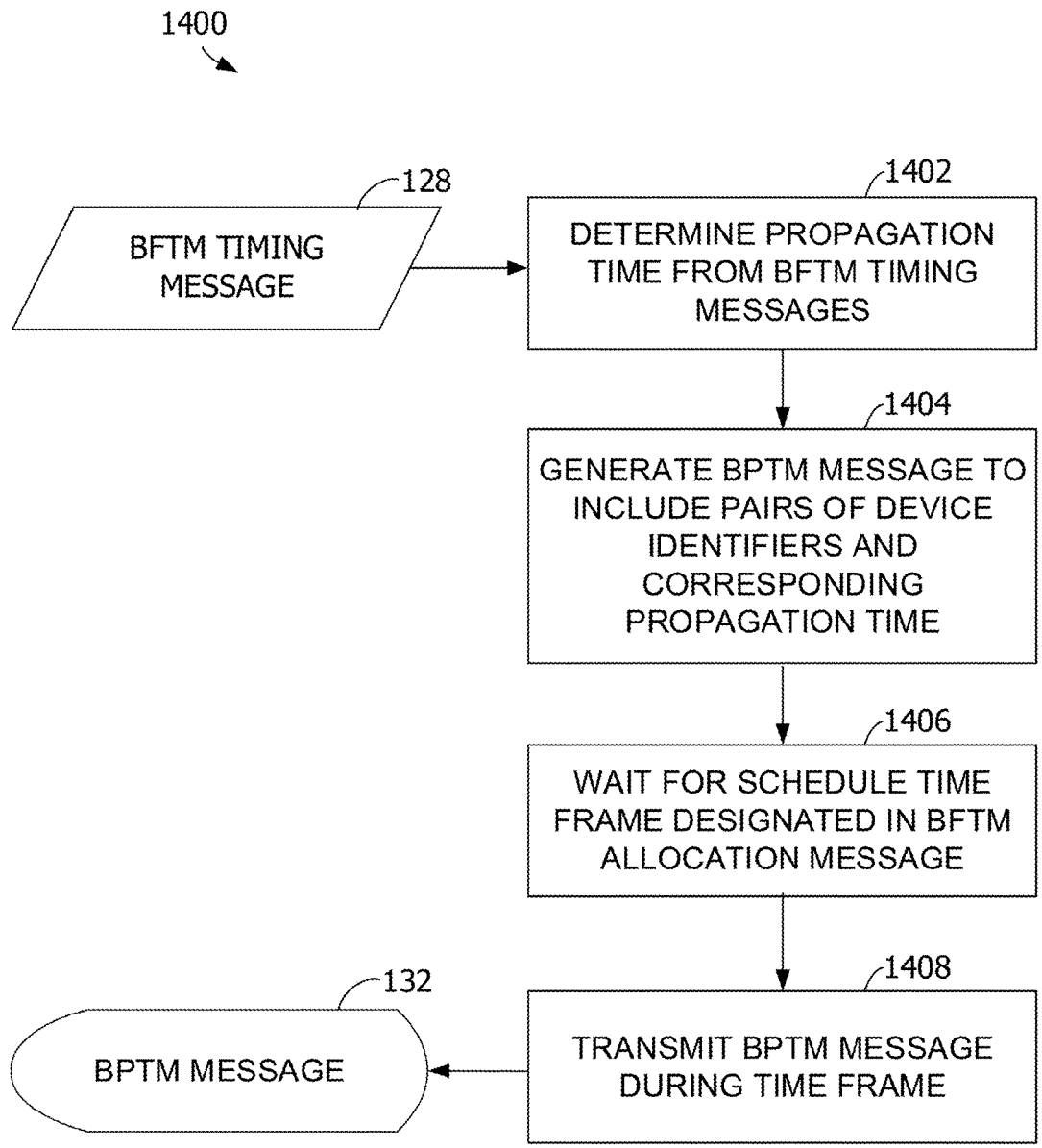
FIG. 14 is a flow chart diagram illustrating a work flow for generating a BFTM message.

FIG. 14 is a flow chart diagram illustrating a work flow 1400 for generating a BFTM message 132 from information provided in BFTM timing messages 128. Initially, a mobile computing device 100 receives a BFTM timing message 128 from another mobile computing device 100. From the BFTM timing message, the receiving mobile computing device 100 determines a propagation time between two pairs of mobile computing devices 100, as shown at block 1402. In some examples, device identifiers are communicated with corresponding propagation times in the BFTM timing messages 128. Such examples provide a way to identify the propagation timing of other mobile computing devices. Alternatively or additionally, the mobile computing device 100 receiving the BFTM timing message 128 may note the TOA of the BFTM timing message 128, identify the TOD that the mobile computing device 100 sent the BFTM timing message 128, and compute a propagation time from difference of those two values.

As shown at block 1404, the receiving mobile computing device 100 generates a BFTM message 132 that identifies one or more pairs of mobile computing devices 100 and corresponding propagation times of messages communicated between the pairs. For example, station D may receive a BFTM timing message 128 from station B that includes a TOD and a propagation times between station B and station C. Station D may then generate a BFTM message 132 that lists a first propagation time between stations D and B, and a second propagation time between stations B and C. In some examples, the mobile computing device 100 waits to transmit the BFTM message 132 until a designated time frame specified in the scheduling order of a BFTM acknowledgment message 126, as shown at block 1406. The mobile computing device transmits the BFTM message 132 during the designated time frame, as shown at block 1408.

Figure 15:
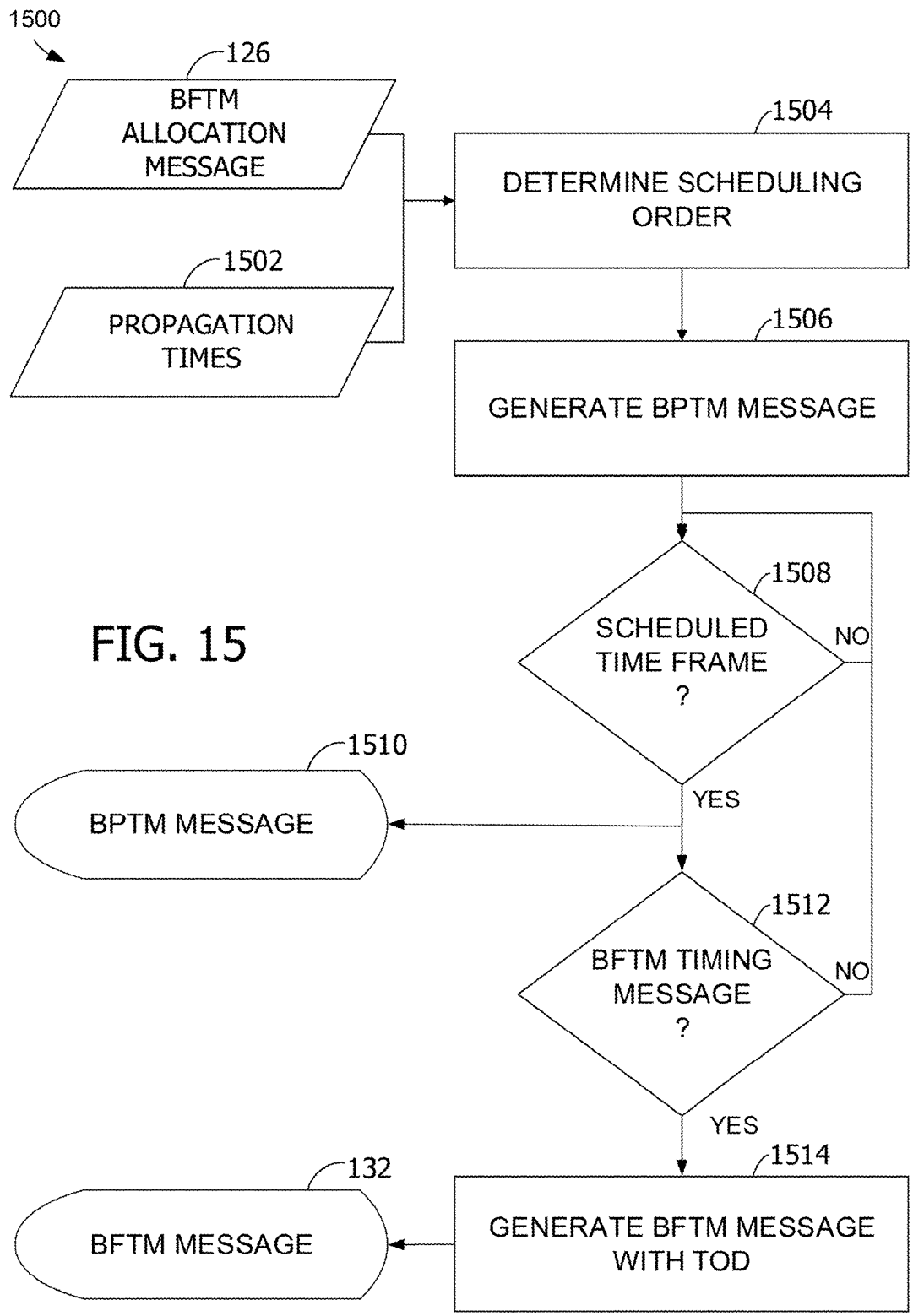
FIG. 15 is a flow chart diagram illustrating a work flow for transmitting BFTM messages according to a scheduling order in a BFTM allocation message.

FIG. 15 is a flow chart diagram illustrating a work flow 1500 for transmitting a BFTM message 132 according to a scheduling order in a BFTM allocation message 126. A mobile computing device 100 receives a BFTM allocation message 126 that includes a scheduling order indicating one or more time frames for the mobile computing device 100 to transmit BFTM messages 132, BFTM timing messages 128, or both. The mobile computing device 100 also receives propagation times 1502 of prior messages communicated between pairs of mobile computing devices 100. The propagation times 1502 may be included in BFTM timing message 128, another BFTM message 132, an FTM message, or through some other communication with another mobile communication device 100.

The mobile computing device 100 parses the BFTM allocation message 126 to determine the scheduling order and respective transmission time frames for the mobile computing device 100, as shown at block 1504. The mobile computing device 100 generates a BFTM message 132 that includes the propagation times 1502 and indications of pairs of other mobile computing device 100 pairs (e.g., MAC addresses, IP addresses, etc.), as shown at block 1506. Additionally or alternatively, the BFTM message 132 may also indicate propagation times of messages communicated between the BFTM-message-generating mobile computing device 100 and another mobile computing device 100.

The mobile computing device 100 to transmit the BFTM message 132 and any BFTM timing messages until the scheduled time frame, as shown at decision block 1508. During the scheduled time frame, which is indicated by the "Yes" path from decision block 1508, the mobile computing device 100 transmits the BFTM message 132 and checks to the see whether any BFTM messages 128 need to be transmitted as well, as shown a decision block 1512. If so, the BFTM timing message 1514 is generated, stamped with a TOD, and transmitted, as shown at block 1514. If not, the mobile computing device 100 waits until the next transmission time frame.

Figure 16A:
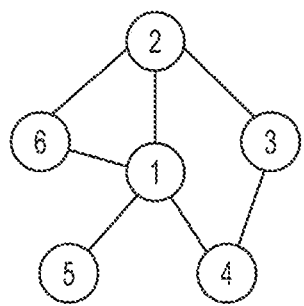
FIG. 16A is a diagram of a partial mapping of device locations generated from BFTM messages.
Figure 16B:
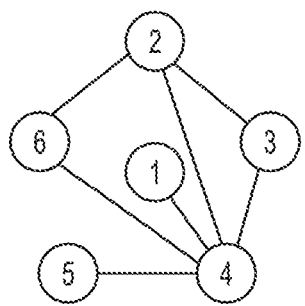
FIG. 16B is a diagram of a partial mapping of device locations generated from BFTM messages.

FIGS. 16A and 16B are diagrams of partial mappings of device locations generated from BFTM timing messages 128, BFTM messages 132, or a combination thereof. These partial mappings show various stations 1-6 being mapped to each other using the propagation times indicated in the BFTM timing messages 128 and/or BFTM messages 132 disclosed herein. For instance, in FIG. 16A, distances are calculated between stations 1 and 2, 1 and 4, 1 and 5, 1 and 6, 2 and 3, and 3 and 4. In FIG. 16B, a different set of partial mappings are determined from another set of BFTM messages 132, e.g., distances between stations 4 and 1, 4 and 2, 4 and 3, 4 and 5, 4 and 6, 2 and 3, and 2 and 6.

In some examples, partial mappings are calculated by a mobile computing device 100 using the BFTM messages 132 received by the mobile computing device 100. In some examples, the mobile computing device 100 calculating the partial mapping may also transmit the partial mapping to other mobile computing devices. This may be done, in some examples, by communicating device identifiers of pairs of mobile computing devices 100 and indications of the calculated distances between the pairs.

Figure 16C:
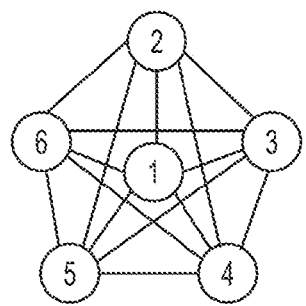
FIG. 16C is a diagram of a complete mapping of device locations generated from BFTM messages.

FIG. 16C is a diagram of a complete mapping of device locations generated form BFTM messages 132. This complete mapping may be calculated based on the timing information received in BFTM messages 132 or from partial mappings received from other mobile computing devices 100.

Additional Examples

Some examples are directed to a mobile computing device configured to generate BFTM messages. The mobile computing device includes memory for storing propagation timing information associated with messages previously communicated between two mobile computing devices. The mobile computing device also includes a processor programmed to identify a scheduled time for transmission of a BFTM message, generate the BFTM message to include the propagation timing information associated with the messages previously communicated between the two mobile computing devices, and transmit the BFTM message during scheduled time for transmission.

Some examples are directed the generation and transmission of BFTM messages. A mobile computing devices receives a propagation time associated with a previous communication of a BFTM, FTM, or BFTM message between two mobile computing devices. The mobile computing device generates BFTM message that includes: (1) device identifiers of the two mobile computing devices, and (2) the propagation time associated with the previous communication of the timing message between the two mobile computing devices. The mobile computing device also transmits the BFTM message to other mobile computing devices, which may use the BFTM message in determining locations of the two mobile computing devices.

Some examples are directed to computer-storage memory embodied with machine-executable instructions for generating and transmitting a BFTM message and a BFTM timing message. A scheduling order is received designating a time frame for a first mobile computing device to transmit the BFTM message and the BFTM message. The BFTM timing message is generated to include at least one TOA associated with a previous timing message received by the first mobile computing device from a second mobile computing device. A propagation time associated with the communication of another timing message between two mobile computing devices is received. The BFTM message is generated to include the propagation time. The first mobile computing device transmits the BFTM timing message and the BFTM message during the time frame.

Alternatively or in addition to the other examples described herein, some examples include any combination of the following:
- a processor programmed to include a propagation time error in the BFTM message indicative of a maximum tolerable propagation timing error;
- a transceiver receiving a BFTM allocation message from a scheduling mobile computing device, the BFTM allocation message indicating the scheduled time;
- a scheduling order comprising a forward sequence of one or more responding computing devices;
- a scheduling order comprising a reverse sequence of one or more responding computing devices;
- a scheduling order indicated in the BFTM allocation message through a sequential listing of one or more responding mobile computing devices;
- a processor programmed to include in the BFTM message at least one pair of device identifiers of two mobile computing devices;
- device identifiers comprising a UDID, a MAC address, an IP address, a UUID, a user ID, or an IDFA;
- a processor configured to generate a BFTM timing message comprising at least one TOA associated with one of the two or more mobile computing devices receiving a timing message, and transmit the BFTM timing message during the scheduled time along with the BFTM message;
- a processor programmed to generate a mapping of the two mobile computing devices based on the propagation timing information;
- a processor programmed to transmit the mapping during the scheduled time;
- a processor programmed to receive a partial mapping for at least two mobile computing devices, and determine locations for one of the at least two mobile computing devices based on the partial mapping;
- a processor programmed to store timing or propagation parameters in a received FTM message from at least one of the two or more responding mobile computing devices;
- receiving a scheduling order indicating a scheduled time frame for transmitting the BFTM message, wherein the BFTM message is transmitted during the scheduled time frame; and
- receiving a BFTM allocation message comprising a listing of device identifiers and corresponding transmission time frames for a plurality of mobile computing devices, and identifying the mobile computing device and the scheduled time frame from the listing of the BFTM allocation message.

While the aspects of the disclosure have been described in terms of various examples with their associated operations, a person skilled in the art would appreciate that a combination of operations from any number of different examples is also within scope of the aspects of the disclosure.

Exemplary Operating Environment

Although described in connection with an exemplary computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

The examples illustrated and described herein, as well as examples not specifically described herein but within the scope of aspects of the disclosure, constitute exemplary means for generating a BFTM message at a mobile device and communicating the generated BFTM message in accordance with the timing specified in a scheduling order provided in BFTM allocation message. For example, the elements described in FIG. 1, such as when encoded to perform the operations illustrated in FIGS. 5-9 and 14-15, constitute exemplary means for a generating a BFTM allocation message 126 with a scheduling order that specifies when responding mobile computing devices are to respond at particular times (e.g., in an echoing fashion, forward sequence, reverse sequence, etc.), and generating a BFTM message that includes propagation times of previous messages communicated between mobile computing devices.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A first mobile computing device, comprising:
    memory of the first mobile computing device for storing propagation timing information associated with messages previously communicated between a second mobile computing device and a third mobile computing device; and
    a processor of the first mobile computing device programmed to:
        identify a scheduled time for transmission of a bulk propagation timing measurement (BPTM) message,
        generate the BPTM message to include the propagation timing information associated with the messages previously communicated between the second mobile computing device and the third mobile computing device,
        transmit the BPTM message during the scheduled time for transmission, and
        generate a location mapping comprising locations of at least the second mobile computing device using the propagation timing information associated with the messages previously communicated between the second mobile computing device and the third mobile computer device.

2. The first mobile computing device of claim 1, wherein the processor is programmed to include a propagation time error in the BPTM message indicative of a maximum tolerable propagation timing error.

3. The first mobile computing device of claim 1, further comprising a transceiver receiving a bulk fine timing measurement (BFTM) allocation message from a scheduling mobile computing device, the BFTM allocation message indicating the scheduled time.

4. The first mobile computing device of claim 1, wherein the scheduling order comprises a forward sequence of one or more responding computing devices.

5. The mobile computing device of claim 4, wherein the scheduling order comprises a reverse sequence of the one or more responding computing devices.

6. The first mobile computing device of claim 4, wherein the scheduling order is indicated in the BFTM allocation message through a sequential listing of the one or more responding mobile computing devices.

7. The first mobile computing device of claim 6, wherein the processor is programmed to:
    generate a bulk fine timing measurement (BFTM) timing message comprising at least one time of arrival (TOA) associated with the first mobile computing device receiving the timing information of the previously communicated messages between the second mobile computing device and the third mobile computing device, and
    transmit the BFTM timing message during the scheduled time along with the BPTM message.

8. The first mobile computing device of claim 1, wherein the processor is programmed to include in the BPTM message at least one pair of device identifiers for at least two of the first mobile computing device, the second mobile computing device, or the third mobile computing device.

9. The first mobile computing device of claim 8, wherein the device identifiers comprise at least one member of a group comprising a unique device identifier (UDID), a media access control (MAC) address, an Internet Protocol (IP) address, a universally unique identifier (UUID), a user identifier (user ID), and an ID for advertisers (IDFA).

10. The first mobile computing device of claim 1, wherein the location mapping is a partial location mapping comprising locations of a subset of mobile computing devices in an area.

11. The first mobile computing device of claim 1, wherein the processor is programmed to transmit the location mapping during the scheduled time.

12. The first mobile computing device of claim 10, wherein the processor is programmed to:
    receives a second location mapping from the second mobile computing device, the second location mapping provide geographic location information for a fourth mobile computing device in an area, and
    determine respective locations of the second mobile computing device and the third mobile computing device relative to the fourth mobile computing device using the received second location mapping.

13. The first mobile computing device of claim 10, wherein the processor of the first mobile computing device is programmed to:
    receive a third location mapping from the fourth mobile computing device, the fourth location mapping provide geographic location information for a fifth mobile computing device in the area; and determine a respective location of the first mobile computing device relative to the fifth mobile computing device using the received second location mapping.

14. The first mobile computing device of claim 1, wherein the processor is programmed to store timing or propagation parameters in a received fine timing measurement (FTM) message from at least one of the second mobile computing device or the third mobile computing device.

15. A method, comprising:

receiving, at a first mobile computing device, a propagation time associated with a previous communication of a timing message between a second mobile computing device and a third mobile computing device;

generating, at the first mobile computing device, a bulk propagation timing measurement (BPTM) message comprising device identifiers of the second mobile computing device and the third mobile computing device and the propagation time associated with the previous communication of the timing message between the second mobile computing device and the third mobile computing device; and transmitting, from the first mobile computing device, the BPTM message to one or more other mobile computing devices for use in determining locations of the two mobile computing devices, wherein the BPTM message is transmitted during a scheduled time frame.

16. The method of claim 15, further comprising receiving a scheduling order indicating the scheduled time frame for transmitting the BPTM message.

17. The method of claim 16, further comprising:

receiving a bulk fine timing measurement (BFTM) allocation message comprising a listing of device identifiers and corresponding transmission time frames for a plurality of mobile computing devices; and identifying the first mobile computing device and the scheduled time frame from the listing of the BFTM allocation message based on the received transmission time frames for the plurality of the mobile computing device.

18. One or more computer-storage memory embodied with machine-executable instructions for generating and transmitting a bulk propagation timing measurement (BPTM) message and a bulk fine timing measurement (BFTM) timing message, comprising:

receiving, at a first mobile computing device, a propagation time associated with a previous communication of a timing message between a second mobile computing device and a third mobile computing device;

generating, at the first mobile computing device, a bulk propagation timing measurement (BPTM) message comprising device identifiers of the second mobile computing device and the third mobile computing device and the propagation time associated with the previous communication of the timing message between the second mobile computing device and the third mobile computing device; and transmitting, from the first mobile computing device, the BPTM message to one or more other mobile computing devices for use in determining locations of the two mobile computing devices, wherein the BPTM message is transmitted during a scheduled time frame.

19. The memory of claim 18, further comprising generating, at the first mobile computing device, a location mapping of the second mobile computing device and the third mobile computing device relative to the first mobile computing device based on the received propagation time associated with the previous communication of the timing message between the second mobile computing device and the third mobile computing device.

20. The memory of claim 19, wherein the first mobile computing device comprises at least one member of a group comprising a mobile phone, a laptop, a tablet, a netbook, a gaming device, an electronic kiosk, a wearable, or a portable media player.

* * * * *